(12) United States Patent
Amano et al.

(10) Patent No.: US 10,099,124 B2
(45) Date of Patent: Oct. 16, 2018

(54) NON-TRANSITORY COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yusuke Amano, Kyoto (JP); Aya Kyogoku, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 359 days.

(21) Appl. No.: 14/859,829

(22) Filed: Sep. 21, 2015

(65) Prior Publication Data

US 2016/0279513 A1    Sep. 29, 2016

(30) Foreign Application Priority Data

Mar. 25, 2015  (JP) ................................. 2015-063233

(51) Int. Cl.

| A63F 13/95 | (2014.01) |
|---|---|
| A63F 13/31 | (2014.01) |
| A63F 13/90 | (2014.01) |
| A63F 13/34 | (2014.01) |
| A63F 13/98 | (2014.01) |
| A63F 13/32 | (2014.01) |
| A63F 13/52 | (2014.01) |
| H04W 4/80 | (2018.01) |

(52) U.S. Cl.
CPC .............. *A63F 13/31* (2014.09); *A63F 13/32* (2014.09); *A63F 13/34* (2014.09); *A63F 13/52* (2014.09); *A63F 13/90* (2014.09); *A63F 13/95* (2014.09); *A63F 13/98* (2014.09); *H04W 4/80* (2018.02)

(58) Field of Classification Search
CPC .......... A63F 13/32; A63F 13/34; A63F 13/95; A63F 13/98; A63F 13/90
USPC ................................................. 463/1, 39, 42
See application file for complete search history.

(56) References Cited

U.S. PATENT DOCUMENTS

| 8,944,922 B2 * | 2/2015 | Westerberg ....... H04M 1/72544 463/40 |
|---|---|---|
| 9,259,651 B1 * | 2/2016 | Yano ....................... A63F 13/40 |

(Continued)

FOREIGN PATENT DOCUMENTS

JP    2000-163524    6/2000

OTHER PUBLICATIONS

Extended European Search Report dated Jul. 21, 2016, issued in corresponding EP Application No. 15185588.9 (7 pages).

Primary Examiner — William H McCullouch, Jr.
Assistant Examiner — Chase Leichliter
(74) Attorney, Agent, or Firm — Nixon & Vanderhye, P.C.

(57) ABSTRACT

An object control section according to one embodiment moves a player object in a virtual space according to an operation performed by a user. When the player object has reached a predetermined position in the virtual space by the operation performed by the user, the object control section issues a read instruction to a communication control section. The communication control section transmits radio wave to a storage medium when receiving the read instruction. When the radio wave is received, electromotive force is generated in the storage medium, and information stored in the storage medium is read by an information processing apparatus.

17 Claims, 15 Drawing Sheets

(56) References Cited

U.S. PATENT DOCUMENTS

| | | | |
|---|---|---|---|
| 2009/0197658 A1* | 8/2009 | Polchin | A63F 9/24 |
| | | | 463/9 |
| 2013/0196766 A1* | 8/2013 | Leyland | A63F 9/24 |
| | | | 463/36 |
| 2013/0263154 A1 | 10/2013 | Ishihara et al. | |
| 2013/0324262 A1* | 12/2013 | Shimohata | H04W 4/008 |
| | | | 463/42 |
| 2014/0121008 A1* | 5/2014 | Canessa | A63F 13/02 |
| | | | 463/29 |
| 2015/0031461 A1 | 1/2015 | Momose et al. | |
| 2016/0101364 A1* | 4/2016 | Scott | A63F 13/23 |
| | | | 463/31 |
| 2016/0206959 A1* | 7/2016 | Nelson | A63F 13/58 |

\* cited by examiner

F I G. 8
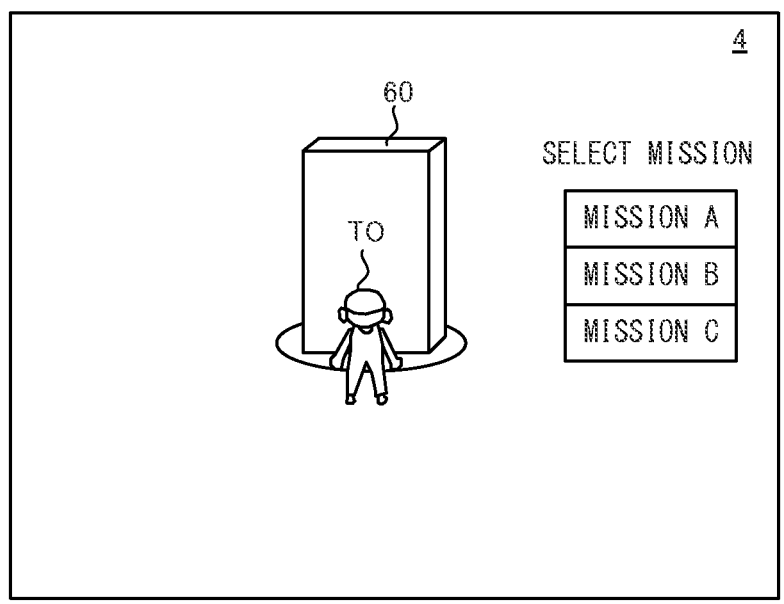
F I G. 9
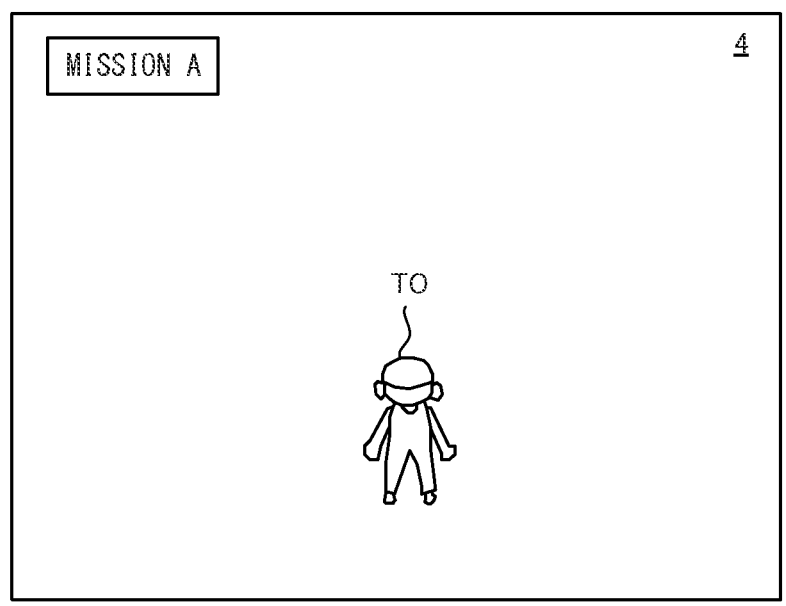

F I G. 1 5

| INFORMATION | ASSOCIATED OBJECT | ASSOCIATED MISSION |
|---|---|---|
| CHARACTER INFORMATION A | CHARACTER A | MISSION M1 |
| | | MISSION M2 |
| | | MISSION M3 |
| CHARACTER INFORMATION B | CHARACTER B | MISSION M1 |
| | | MISSION M4 |
| | | MISSION M5 |
| CHARACTER INFORMATION C | CHARACTER C | MISSION M6 |
| | | MISSION M7 |
| | | MISSION M8 |

NON-TRANSITORY COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2015-63233, filed on Mar. 25, 2015, are incorporated herein by reference.

FIELD

The technology herein relates to an information processing program, an information processing apparatus, an information processing system, and an information processing method for performing near field communication.

BACKGROUND AND SUMMARY

To date, a technique in which communication between apparatuses is performed by near field communication such as the NFC (Near Field Communication) standard has been known.

However, in the conventional art, there is a room for improvement in using the near field communication technique so as to associate an object in a virtual space and the near field communication with each other.

Therefore, one of objects of the present technology is to provide an information processing program, an information processing apparatus, an information processing system, and an information processing method that allows near field communication to be controlled by using an operation object controlled by an operation of a user.

To achieve the above object, the exemplary embodiment employs the following configurations.

The present disclosure provides an information processing program to be executed by a computer of an information processing apparatus capable of obtaining information stored in an information storage medium through near field communication. The information processing program causes the computer to function as a positioning section, an object control section, a determination section, and a setting section. The positioning section is configured to position, in a virtual space, an operation object to be operated. The object control section is configured to control the operation object in the virtual space according to an operation performed by a user. The determination section is configured to determine whether or not the operation object controlled by the object control section satisfies a predetermined condition. The setting section is configured to perform setting such that information stored in the information storage medium can be obtained when the determination section determines that the operation object satisfies the predetermined condition.

According to the above configuration, when the operation object satisfies a predetermined condition, the information stored in the information storage medium can be obtained. Thus, the information can be obtained from the information storage medium and a process can be performed according to, for example, the operation object satisfying a predetermined condition.

In another configuration, when the determination section determines that the operation object satisfies the predetermined condition, the settings section may perform setting such that the information can be read from the information storage medium through the near field communication.

According to the above configuration, when the operation object satisfies a predetermined condition, the information can be read from the information storage medium.

In another configuration, the setting section may operate such that, when the determination section determines that the operation object satisfies the predetermined condition, radio wave is transmitted for reading the information from the information storage medium.

According to the above configuration, when the operation object satisfies a predetermined condition, the information processing apparatus can transmit radio wave. Therefore, transmission of unnecessary radio wave can be reduced before the operation object satisfies the predetermined condition, thereby reducing power consumption.

In another configuration, whether or not the operation object satisfies the predetermined condition may be repeatedly determined, and the setting section may perform setting such that the information stored in the information storage medium can be obtained while the determination section determines that the operation object satisfies the predetermined condition.

According to the above configuration, while the operation object satisfies a predetermined condition, the information stored in the information storage medium can be obtained.

In another configuration, the setting section may perform setting such that the information stored in the information storage medium can be obtained when and after the determination section has determined that the operation object satisfies the predetermined condition.

According to the above configuration, after the operation object has satisfied the predetermined condition, the information stored in the information storage medium can be obtained.

In another configuration, the determination section may determine that the predetermined condition is satisfied when the operation object has entered a predetermined state.

According to the above configuration, setting can be performed such that the information stored in the information storage medium can be obtained according to a state of the operation object.

In another configuration, the determination section may determine that the predetermined condition is satisfied when the operation object is positioned at a predetermined position in the virtual space.

According to the above configuration, when the operation object has reached a predetermined position, setting can be performed such that the information stored in the information storage medium can be obtained.

In another configuration, the predetermined position may be within a predetermined range in the virtual space.

According to the above configuration, when the operation object has entered a predetermined range, setting can be performed such that the information stored in the information storage medium can be obtained.

In another configuration, the determination section may determine that the predetermined condition is satisfied when the operation object is positioned near a predetermined object positioned in the virtual space.

According to the above configuration, when the operation object is positioned near the predetermined object, setting can be performed such that the information stored in the information storage medium can be obtained.

In another configuration, the determination section may determine that the predetermined condition is satisfied when a distance between the operation object and the predetermined object is less than or equal to a predetermined value.

According to the above configuration, when a distance between the operation object and the predetermined object is less than or equal to a predetermined value, setting can be performed such that the information stored in the information storage medium can be obtained.

In another configuration, the information processing program may cause the computer to further function as a processing section configured to perform a predetermined process by obtaining the information stored in the information storage medium, when the setting section performs setting such that the information stored in the information storage medium can be obtained.

According to the above configuration, the information stored in the information storage medium is obtained to enable a predetermined process to be performed.

In another configuration, the processing section may perform the predetermined process so as to be associated with the operation object.

According to the above configuration, a predetermined process can be performed according to the operation object. For example, the predetermined process can be performed according to a kind or a state of the operation object.

In another configuration, the processing section may perform the predetermined process so as to be associated with the information obtained from the information storage medium.

According to the above configuration, the predetermined process can be made different according to the information obtained from the information storage medium.

In another configuration, the processing section may perform replacement of the operation object with an object associated with the information obtained from the information storage medium, as the predetermined process.

According to the above configuration, the operation object can be replaced with an object associated with the information obtained from the information storage medium.

In another configuration, the information processing apparatus can perform the near field communication when the information processing apparatus and the information storage medium are close to each other.

According to the above configuration, when the information processing apparatus and the information storage medium are close to each other, the information can be obtained from the information storage medium.

(Configuration A1)

Further, the present disclosure also provides an information processing program to be executed by a computer of an information processing apparatus that obtains information stored in an information storage medium through near field communication. The information processing program causes the computer to function as a positioning section, an object control section, an obtaining section, and a changing section. The positioning section is configured to position, in a virtual space, an operation object to be operated. The object control section is configured to control the operation object according to an operation performed by a user. The obtaining section is configured to obtain information from the information storage medium through the near field communication. The changing section is configured to change an object controlled by the object control section from the operation object to another object associated with the information obtained by the obtaining section.

According to the above configuration, when the information is read from the information storage medium through the near field communication, the operation object can be changed to another object, whereby an operation subject to be operated by a user can be changed to another object.

(Configuration A2)

In Configuration A1, the changing section may replace the operation object with said another object.

According to the above configuration, when the information is read from the information storage medium through the near field communication, the operation object can be replaced with another object.

(Configuration A3)

In Configuration A1, the changing section may additionally position said another object in the virtual space, and the object controlled by the object control section may be changed to said another object having been additionally positioned.

According to the above configuration, another object can be additionally positioned in the virtual space, and an object to be operated can be changed to said another object having been additionally positioned. Thus, for example, in a state where the operation object remains positioned in the virtual space, the object to be operated can be changed to another object.

(Configuration A4)

In Configurations A1 to A3, the computer may be caused to further function as a processing section configured to perform a predetermined process by using said another object obtained by the change by the changing section.

According to the above configuration, the predetermined process can be performed by using another object obtained by the change, and, for example, a game using another object can be performed.

(Configuration A5)

In Configuration A4, when the predetermined process ends, the changing section may return the object controlled by the object control section from said another object to the operation object.

According to the above configuration, while the predetermined process is being performed, said another object obtained by the change can be used.

(Configuration A6)

In Configurations A1 to A5, the information processing apparatus may perform the near field communication when the information processing apparatus and the information storage medium are close to each other.

According to the above configuration, when the information processing apparatus and the information storage medium are close to each other, the information can be obtained from the information storage medium.

(Configuration B1)

Further, the present disclosure also provides an information processing program to be executed by a computer of an information processing apparatus that obtains information stored in an information storage medium through near field communication. The information processing program causes the computer to function as a setting section, an obtaining section, a determination section, and a processing section. The setting section is configured to set predetermined read timing. The obtaining section is configured to obtain information from the information storage medium through the near field communication. The determination section is configured to determine whether or not timing when the information has been obtained by the obtaining section meets the predetermined read timing having been set by the setting section. The processing section is configured to perform a predetermined process based on a result of determination by the determination section.

According to the above configuration, the predetermined read timing is preset, and the predetermined process can be performed according to whether or not timing when the information has been read from the information storage medium through the near field communication meets the predetermined read timing. For example, the predetermined process can be performed based on whether or not a point of time when the information has been read from the information storage medium is in a predetermined read period.

Here, the "predetermined read timing" may be a point of time or a time period. Further, the "timing when the information has been read from the information storage medium" may be a point of time or a time period. Further, the "two timings meet each other" means that one timing (a point of time or a time period) is in the other timing (a point of time or a time period), or that one timing (a point of time or a time period) and the other timing (a point of time or a time period) are the same. For example, the predetermined read period is set, and whether or not a point of time when the information has been read from the information storage medium is in the read period, may be determined. Further, a predetermined read time point is set, and whether or not a point of time when the information has been read from the information storage medium and the read time point meet each other may be determined.

(Configuration B2)

In Configuration B1, the setting section may display the read timing associated with the information storage medium.

According to the above configuration, the predetermined read timing having been set so as to be associated with the information storage medium can be displayed.

(Configuration B3)

In Configuration B1 or B2, the information processing apparatus can communicate with a plurality of the information storage mediums through the near field communication, and the setting section may set the read timing associated with each information storage medium.

According to the above configuration, the read timing associated with each information storage medium can be set.

(Configuration B4)

In Configuration B3, the setting section may set the read timing associated with each information storage medium such that read timings associated with the plurality of the information storage mediums do not overlap each other.

According to the above configuration, the read timings can be prevented from overlapping each other. Thus, for example, when plural persons have the information storage mediums, respectively, and use the information storage mediums to execute an application, the application can be smoothly executed.

(Configuration B5)

In Configuration B3 or B4, the setting section may set an order for the read timings such that the order for the read timings associated with the information storage mediums is variable.

According to the above configuration, the order for the read timings can be set to be variable.

(Configuration B6)

In Configuration B3 or B4, the setting section may set the read timings associated with the information storage mediums in a predetermined order.

According to the above configuration, the read timings can be set in a predetermined order.

(Configuration B7)

In Configurations B3 to B6, the setting section may set a read period as the predetermined read timing, and may set the read period such that the read periods associated with the information storage mediums are equal to each other.

According to the above configuration, a length of each read period can be set to be equal.

(Configuration B8)

In Configurations B1 to B7, the processing section may perform a first process when the determination section determines that timing when the information has been obtained by the obtaining section meets the predetermined read timing having been set by the setting section.

According to the above configuration, in a case where the timing when the information has been read from the information storage medium is the predetermined read timing, the first process can be performed.

(Configuration B9)

In Configuration B8, the processing section may perform a second process that is more disadvantageous to a user than the first process when the determination section determines that the timing when the information has been obtained by the obtaining section does not meet the predetermined read timing having been set by the setting section.

According to the above configuration, in a case where the timing when the information has been read from the information storage medium is not the predetermined read timing, the second process that is more disadvantageous than the first process can be performed. Thus, for example, when a user operates such that the information in the information storage medium is read at timing other than the predetermined read timing, a penalty can be imposed on the user.

(Configuration B10)

In Configurations B1 to B9, the setting section may set the read period as the predetermined read timing, and may increase or reduce the read period according to a result of determination by the determination section.

According to the above configuration, the predetermined read period can be increased or reduced according to whether or not the timing when the information has been read from the information storage medium is the predetermined read period.

(Configuration B11)

In Configurations B1 to B10, the information processing apparatus may perform the near field communication when the information processing apparatus and the information storage medium are close to each other.

According to the above configuration, when the information processing apparatus and the information storage medium are close to each other, the information can be obtained from the information storage medium.

(Configuration C)

Furthermore, the present disclosure also provides an information processing program to be executed by a computer of an information processing apparatus that obtains information stored in an information storage medium through near field communication. The information processing program causes the computer to function as a setting section, an obtaining section, a determination section, and a processing section. The setting section is configured to set a predetermined read timing. The obtaining section is configured to obtain information from the information storage medium through the near field communication. The determination section is configured to determine whether or not the obtaining section has obtained the information from the information storage medium at the predetermined read timing having been set by the setting section. The processing section is configured to perform a predetermined process based on a result of determination by the determination section.

According to the above configuration, the predetermined read timing is preset, and the predetermined process can be performed according to whether or not the information has been read from the information storage medium through the near field communication at the read timing having been set. Herein, the predetermined read timing may be a point of time or a time period. That is, whether or not the information has been obtained from the information storage medium at the predetermined read time point having been set, may be determined, or whether or not the information has been obtained from the information storage medium in the predetermined read time period having been set, may be determined.

The present disclosure also provides an information processing apparatus, an information processing system, and an information processing method that execute the information processing program as described above.

According to the present disclosure, the information stored in the information storage medium can be obtained through the near field communication, and when the operation object satisfies a predetermined condition, the information stored in the information storage medium can be obtained.

These and other objects, features, aspects and advantages of the exemplary embodiment will become more apparent from the following detailed description when taken in conjunction with the accompanying drawings.

BRIEF DESCRIPTION OF THE DRAWINGS

FIG. 8 is a diagram illustrating a non-limiting example of an image displayed after the information processing apparatus 3 has read the information stored in the tag 2;

FIG. 9 is a diagram illustrating a non-limiting example of an image displayed when a mission is selected and performed by a user;

FIG. 12 is a diagram illustrating a non-limiting example of a flow of a process for maintaining customization information for the player object PO also after the player object PO has been replaced with a tag object TO;

FIG. 15 is a diagram illustrating a non-limiting example of information read from the tag 2 and types of a tag object and missions which are associated with the information;

DETAILED DESCRIPTION OF NON-LIMITING EXAMPLE EMBODIMENTS

Figure 1:
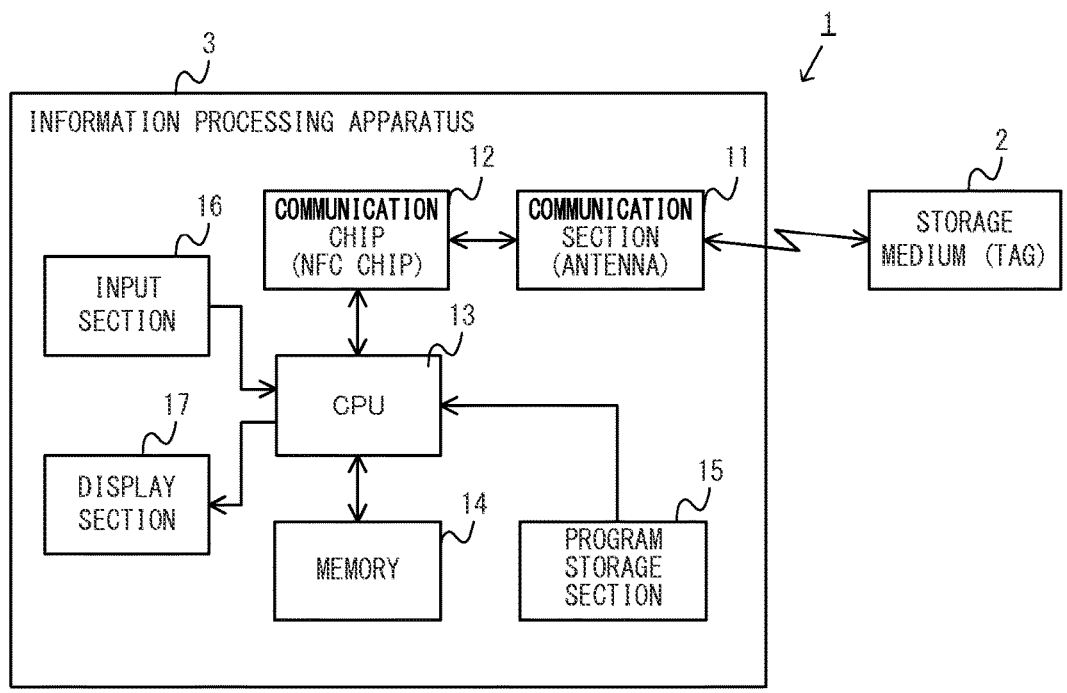
FIG. 1 is a diagram illustrating a non-limiting example of a configuration of an information processing system according to an embodiment.

Hereinafter, an information processing system according to an example of an embodiment will be described. FIG. 1 is a diagram illustrating an example of a configuration of the information processing system according to the present embodiment. As shown in FIG. 1, an information processing system 1 includes a storage medium (tag) 2 and an information processing apparatus 3. The information processing apparatus 3 is any information processing apparatus capable of performing near field communication with the tag 2.

In the present embodiment, communication, between the information processing apparatus 3 and the tag 2, based on the NFC standard will be described as an example of the near field communication. In the description herein, the near field communication represents a communication which can be performed when a distance between the information processing apparatus 3 and the tag 2 ranges, for example, from several centimeters to several meters (typically, the distance therebetween is a very short distance ranging from several centimeters to several tens of centimeters). The near field communication typically represents a communication mode in which radio wave (for example, electromagnetic induction) from one device causes generation of electromotive force in the other device. The other device can operate by the generated electromotive force (the other device may have a power supply or may not have a power supply). In the near field communication, when the information processing apparatus 3 and the tag 2 come close to each other (in the present embodiment, when a distance therebetween is shorter than or equal to several tens of centimeters), communication can be performed. The near field communication between one device and the other device may be performed in such a manner that power is supplied to the other device from a power supply provided in the other device without generating electromotive force in the other device by radio wave from the one device.

The information processing apparatus 3 is any information processing apparatus capable of performing the near field communication. In the present embodiment, the information processing apparatus 3 is, for example, a hand-held (also referred to as portable) device, such as a hand-held game apparatus, a mobile phone, a smart phone, or a tablet computer, which operates by a battery. For example, the information processing apparatus 3 may be a hand-held device that can function as an NFC reader/writer. Further, the information processing apparatus 3 may be not only a hand-held device which operates by a battery, but also a stationary device such as a personal computer or a home-use game machine, or a large apparatus such as an arcade game apparatus for commercial use.

The tag 2 is any storage medium capable of performing the near field communication with the information processing apparatus 3 and of storing information. In the present embodiment, the tag 2 is a storage medium that can function as an NFC tag. That is, the tag 2 includes a circuit (IC chip) for performing the near field communication, and a storage device (such as a memory) for storing data. The tag 2 is not limited to a device that merely functions to store data, and may be, for example, an information processing apparatus (electronic device having a CPU, a RAM, or the like) having an NFC card emulation function. Further, the tag 2 may be an information processing apparatus (electronic device) having an NFC terminal-to-terminal communication function.

Hereinafter, a configuration of the information processing apparatus 3 will be described. As shown in FIG. 1, the information processing apparatus 3 includes a communication section 11. The communication section 11 is an antenna used for the near field communication. The information processing apparatus 3 includes a communication chip 12. The communication chip 12 generates a signal (radio wave) to be transmitted from the communication section 11, according to an instruction from a CPU 13 described below. The generated signal is transmitted from the communication section 11. The communication chip 12 is, for example, an NFC chip.

As shown in FIG. 1, the information processing apparatus 3 includes the CPU 13 and a memory 14. The CPU 13 is an information processing section for executing various information processes to be performed by the information processing apparatus 3. The CPU 13 performs various information processes in conjunction with the memory 14. For example, the CPU 13 executes a predetermined application program to perform a process based on an input to an input section 16. The CPU 13 outputs, to a display section 17, an image as a result of the process. As the display section 17, any display unit such as a liquid crystal display unit or an organic EL display unit, may be used. The display section 17 may be implemented as a stationary display unit (for example, television) which is separate from the information processing apparatus 3, as a hand-held display unit (for example, touch display) integrated with (or separate from) the information processing apparatus 3, or as a combination thereof.

The information processing apparatus 3 includes a program storage section 15. In the program storage section 15, various programs (such as a communication program for controlling the communication chip 12, or an application program for executing an application described below) executed by the information processing apparatus 3 are stored. The program storage section 15 is any storage device (storage medium) accessible by the CPU 13. The program storage section 15 may be implemented as, for example, a storage section, such as a hard disk or a non-volatile memory, which is incorporated in the information processing apparatus 3, as, for example, a storage medium, such as an optical disc or a cartridge, which is detachably mounted to the information processing apparatus 3, or as both the above storage section and storage medium. Further, the information processing apparatus 3 may obtain various programs via a network from an external storage device, and execute the programs.

In the present embodiment, in the information processing apparatus 3, at least two kinds of programs, that is, the application program and the communication program, are stored in the program storage section 15. The application program is a program for executing any application (for example, a game application, a messaging application, a web browser application, a document creating/displaying application, or the like). The communication program is a program for performing the near field communication with the tag 2. For example, the communication program is implemented as firmware for operating the communication chip 12, and may be previously prepared as a library in the information processing apparatus 3. In response to an instruction from the application, the communication program causes the communication chip 12 to operate for communication. In the information processing apparatus 3, a plurality of application programs can be executed, and the communication program is used in common by the applications.

Further, the information processing apparatus 3 includes the input section 16, such as a button or a touch panel, which receives an instruction (operation) from a user.

The information processing apparatus 3 may be configured by a plurality of devices. For example, a device including the communication section 11 and the communication chip 12 may be detachably connected to a device including the CPU 13 and the memory 14, thereby configuring the information processing apparatus 3. Further, the information processing apparatus 3 may be configured such that a main device having the CPU 13, and a device having the input section 16 and/or the display section 17 may be separate from each other. For example, the information processing apparatus 3 may be configured by a main device and a terminal device having the input section 16 and the display section 17, or configured by a main device and an operation device having the input section 16. At this time, the communication section 11 and the communication chip 12 may be provided in the main device, or provided in the terminal device. Further, the information processing apparatus 3 may not have the display section 17, and may use a television as a display unit.

Further, in another embodiment, at least a portion of an information process performed by the information processing apparatus 3 may be divided and performed by a plurality of devices that can communicate with each other via a network (a wide area network such as the Internet and/or a local area network).

Figure 2:
FIG. 2 is a diagram illustrating a non-limiting example of an outer appearance of a tag 2.

FIG. 2 is a diagram illustrating an example of an outer appearance of the tag 2. As shown in FIG. 2, in the present embodiment, the tag 2 is a figure-like tag that has an outer appearance representing a character. The character represented by the tag 2 is a character that appears in a specific application (for example, game application) executable by the information processing apparatus 3. The user can cause the character to appear in the specific application by using the tag 2. That is, the information processing apparatus 3 uses data stored in the tag 2 when executing a program of the specific application, whereby the information processing apparatus 3 causes the above character to appear in a virtual space generated by the program of the application. The figure-like tag 2 represents any object that appears in the application, and may represent an item in the game application as well as a character.

Figure 3:
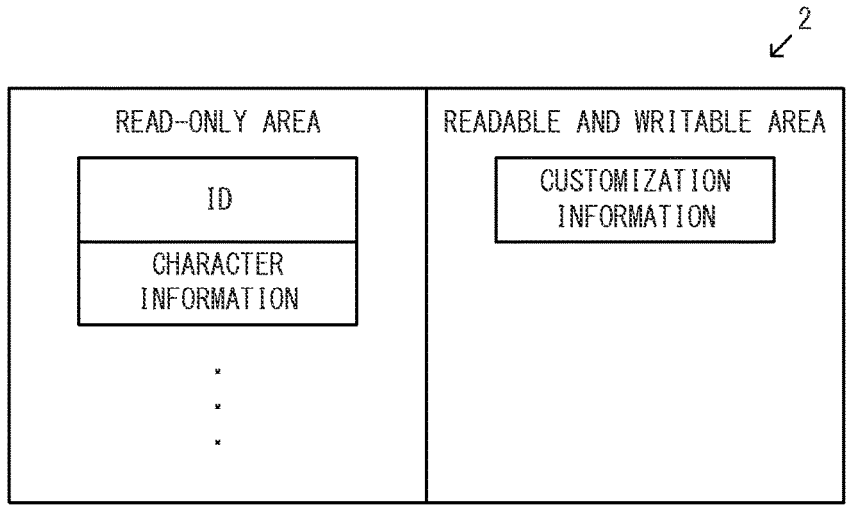
FIG. 3 is a diagram illustrating a non-limiting example of data stored in the tag 2.

FIG. 3 is a diagram illustrating an example of data stored in the tag 2. As shown in FIG. 3, a storage area of the tag 2 is divided into a read-only area and a readable and writable area. In the read-only area, an ID unique to the tag 2, and character information (information representing an ID of a character, a name of the character, and data (shape data, image data) representing a shape and an outer appearance of the character, and the like) are stored. In the read-only area, the information processing apparatus 3 is allowed to perform only reading of the information, and is not allowed to perform, for example, addition, deletion, and editing of information. On the other hand, in the readable and writable area, the information processing apparatus 3 is allowed to perform, for example, addition, deletion, and editing of information, and is also allowed to read information stored in the readable and writable area. For example, as described below, customization information for an object customized by the user may be stored in the readable and writable area.

First Embodiment

Figure 4:
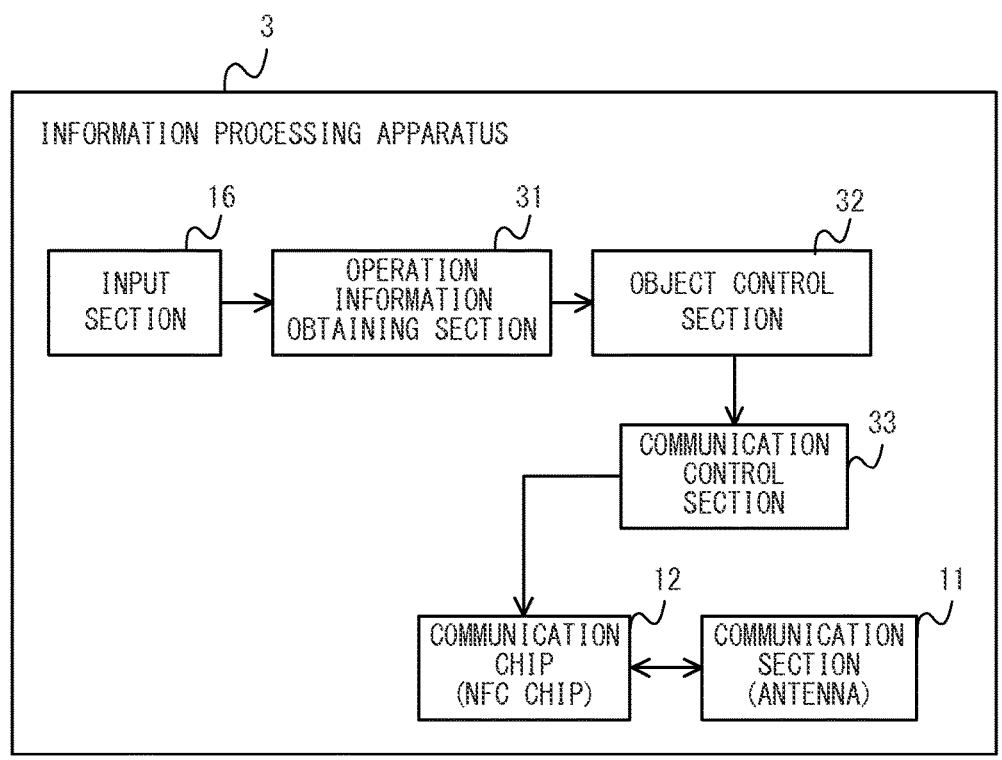
FIG. 4 is a block diagram illustrating a non-limiting example of a functional configuration of an information processing apparatus 3 according to a first embodiment.

Next, a first embodiment will be described. FIG. 4 is a block diagram illustrating an example of a functional configuration of the information processing apparatus 3 according to the first embodiment. In FIG. 4, the same components as shown in FIG. 1 are denoted by the same reference numerals, and description thereof is not given. As shown in FIG. 4, the information processing apparatus 3 includes an operation information obtaining section 31, an object control section 32, and a communication control section 33. The operation information obtaining section 31 and the object control section 32 are implemented by the CPU 13 of the information processing apparatus 3 executing a predetermined application program (for example, game program). The communication control section 33 is implemented by the CPU 13 executing the communication program.

The operation information obtaining section 31 obtains operation information representing an operation performed on the input section 16. The CPU 13 of the information processing apparatus 3 executes a predetermined application program to establish a virtual space and position an object (player object) in the virtual space. The object control section 32 controls the object based on the operation information obtained by the operation information obtaining section 31. For example, when a game program is executed as the predetermined application program, the object control section 32 moves the player object in the virtual space (game space) according to an operation performed on the input section 16 by the user.

The communication control section 33 controls the communication chip 12 so as to allow communication between the tag 2 and the information processing apparatus 3 according to an instruction from the object control section 32. Specifically, the communication control section 33 controls the communication chip 12 so as to be able to read information from the tag 2 (or write information into the tag 2) according to an instruction from the object control section 32. That is, radio wave is transmitted from the communication section 11 according to an instruction from the object control section 32, and the information processing apparatus 3 is allowed to read information stored in the tag 2 (or write information into the tag 2).

Figure 5:
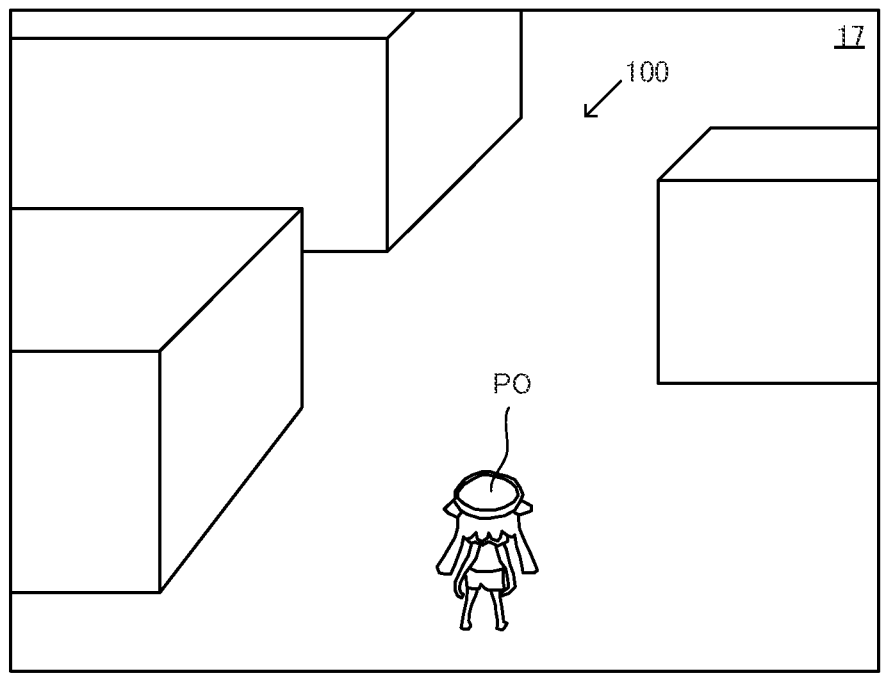
FIG. 5 is a diagram illustrating a non-limiting example of an image displayed on a display section 17 in the case of an application according to the first embodiment being executed.

Next, an example of an application executed by the information processing apparatus 3 will be described. In the first embodiment, a game in which the user operates the player object positioned in the virtual space is performed as an example of the application. FIG. 5 is a diagram illustrating an example of an image displayed on the display section 17 in the case of the application according to the first embodiment being executed.

As shown in FIG. 5, in a virtual space 100, a player object PO operated by a user of the information processing apparatus 3 is positioned. In the virtual space 100, a wall object, other characters, a virtual camera, and the like as well as the player object PO are positioned. The virtual camera is positioned behind the player object PO, and takes an image of the virtual space including the player object PO. The image taken by the virtual camera is outputted to the display section 17. For example, the information processing apparatus 3 is allowed to perform wired or wireless communication with another information processing apparatus 3 connected to a network (local area network or wide area network such as the Internet). For example, a plurality of the information processing apparatuses 3 communicate with each other via the network, whereby one network game may be played by a plurality of users.

The user of the information processing apparatus 3 operates the input section 16 to move the player object PO in the virtual space 100 or cause the player object PO to act in the virtual space 100. For example, the input section 16 includes a direction indication key (cross button, analog pad, joystick, or the like) for indicating a direction in which the player object PO is to move. The player object PO moves in the virtual space according to an operation performed on the direction indication key. As the input section 16, for example, a mouse or a touch panel as well as the direction indication key may be used. Further, as the input section 16, an input device including an inertial sensor such as an acceleration sensor or an angular velocity sensor may be used, and a user may move the input device to move the player object PO in the virtual space. Further, an image of a motion of a user is taken by a camera, to move the player object PO in the virtual space according to the motion of the user.

Figure 6:
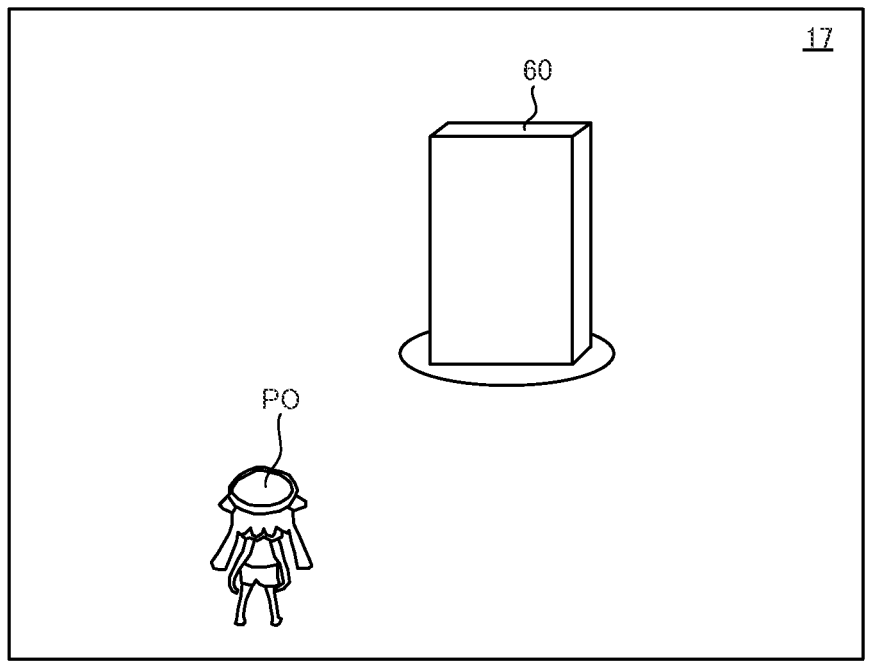
FIG. 6 is a diagram illustrating a non-limiting example of an image including a read determination object 60 positioned in a virtual space 100.
Figure 7:
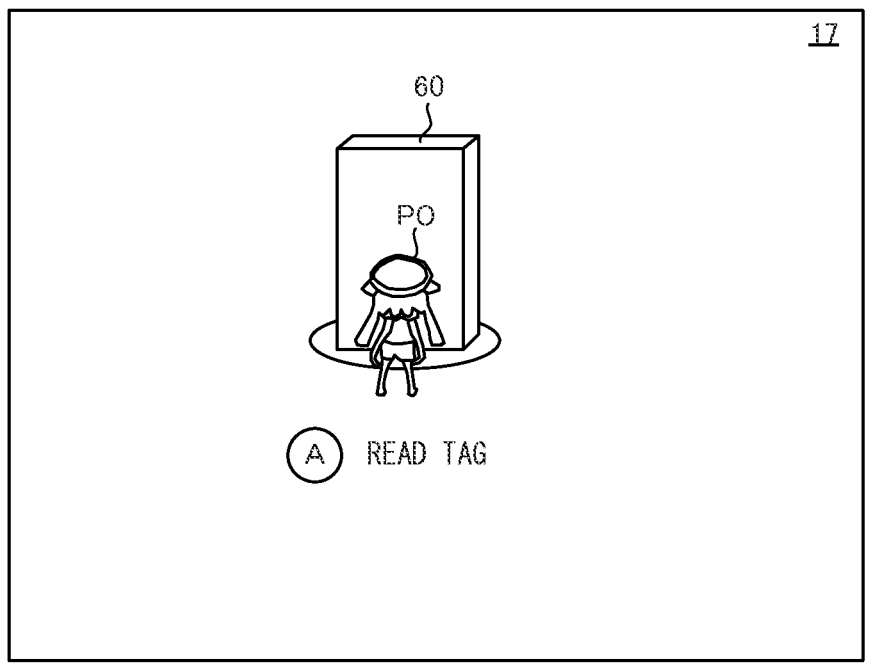
FIG. 7 is a diagram illustrating a non-limiting example of an image displayed when a player object PO has been moved to a position of the read determination object 60.

When the user operates the input section 16 to move the player object PO in the virtual space 100, a read determination object 60 as shown in FIG. 6 is displayed. FIG. 6 is a diagram illustrating an example of an image including the read determination object 60 positioned in the virtual space 100. FIG. 7 is a diagram illustrating an example of an image displayed when the player object PO has been moved to a position of the read determination object 60.

As shown in FIG. 6, the read determination object 60 is positioned in the virtual space. The read determination object 60 is fixed at a predetermined position in the virtual space. The read determination object 60 may be moved in the virtual space. As shown in FIG. 7, when the player object PO approaches the read determination object 60 (when the player object PO enters a predetermined range having the read determination object 60 at the center thereof), an image (character string) for determining whether or not information stored in the tag 2 is to be read is displayed. For example, the input section 16 includes an "A" button. When the user presses the "A" button in a state where the image shown in FIG. 7 is displayed, the information stored in the tag 2 can be read. An operation of pressing of the "A" button by a user may be omitted. That is, when the player object PO enters the predetermined range having the read determination object 60 at the center thereof, even if the "A" button is not pressed, reading of the information stored in the tag 2 may be allowed.

After the user has pressed the "A" button in a state where the image shown in FIG. 7 is displayed, when the tag 2 is moved close to a predetermine position (a position at which communicate with the tag 2 can be performed) of the information processing apparatus 3 by the user, the information processing apparatus 3 can read information stored in the tag 2. For example, the information processing apparatus 3 includes a placement portion in which the tag 2 is placed, and when the tag 2 is placed at the placement portion, the information processing apparatus 3 can read the information stored in the tag 2. In the present embodiment, while the player object PO is in the predetermined range having the read determination object 60 at the center thereof, the information processing apparatus 3 can read the information stored in the tag 2. When the player object PO is outside the predetermined range, the information processing apparatus 3 cannot read the information stored in the tag 2.

FIG. 8 is a diagram illustrating an example of an image displayed after the information processing apparatus 3 has read the information stored in the tag 2. As shown in FIG. 8, when the information stored in the tag 2 has been read by the information processing apparatus 3, the player object PO is replaced with a tag object TO. The tag object TO is an object associated with the information stored in the tag 2. For example, the tag object TO is a virtual character that is the same character as represented by the tag 2 itself as shown in FIG. 2. The information processing apparatus 3 reads the character information stored in the read-only area of the tag 2, and causes the character associated with the character information to appear as the tag object TO in the virtual space.

As the tag 2, a plurality of kinds of tags are present. Different character information is stored for each tag 2. The information processing apparatus 3 causes the tag object associated with the read character information to appear in the virtual space. The tag objects TO are associated with missions, respectively, which are different for each tag object. For example, as shown in FIG. 8, the tag object TO is associated with a mission A to a mission C. A mission associated with the information read from the tag 2 may be selected without replacing the player object PO with the tag object TO. That is, when the player object PO approaches the read determination object 60, information can be read from the tag 2, and a list of the missions associated with the information read from the tag 2 may be displayed, to allow any of the missions to be selected. The selected mission may be performed by using the player object PO. In this case, a name and an image of a character associated with the information read from the tag 2 may be displayed near the list of the missions.

The mission is a kind of a game played by a player, and is, for example, a game for attaining a certain purpose. For example, the mission A may be a game which aims at collecting predetermined items positioned in the virtual space within a predetermined time period. For example, the mission B may be a game which aims at defeating an opponent object positioned in the virtual space within a predetermined time period. The mission C may be a game which aims at attaining a predetermined purpose in cooperation with another user. The user is allowed to select any mission from among the plurality of the missions associated with the tag object TO. The user operates the input section 16, to select any of the missions, whereby the mission is started. When the user performs a predetermined operation in a state shown in FIG. 8, a state of the process may return to a state where the tag 2 can be read again (FIG. 7).

FIG. 9 is a diagram illustrating an example of an image displayed when the mission is selected and performed by the user. As shown in FIG. 9, when the mission is selected, a mission game using the tag object TO is started. That is, the user operates the input section 16 to control the tag object TO, thereby performing a predetermined mission game. For example, the user operates the input section 16 to move the tag object TO in the virtual space, and performs collection of predetermined items positioned in the virtual space within a predetermined time period. That is, when the information processing apparatus 3 reads the character information stored in the tag 2, an operation subject to be operated by the user with the use of the input section 16 is changed from the player object PO to the tag object TO. The user operates the tag object TO obtained by the change to perform the mission. When the mission ends, the operation subject to be operated by the user is returned from the tag object TO to the player object PO.

Figure 10:
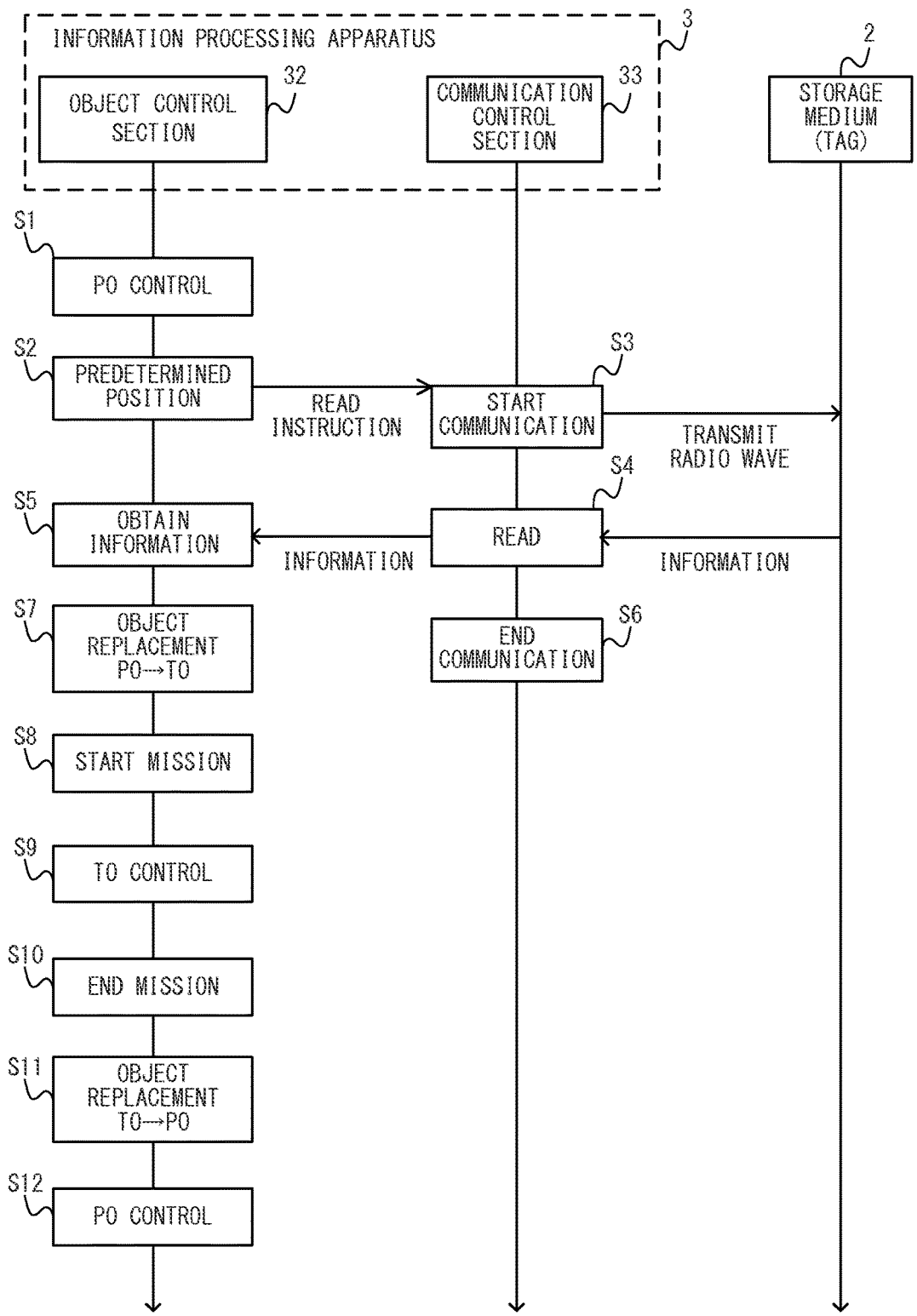
FIG. 10 is a diagram illustrating a non-limiting example of a flow of a process performed by an information processing system 1 according to the first embodiment.

FIG. 10 shows an example of a flow of a process performed by the information processing system 1 according to the first embodiment. As shown in FIG. 10, the object control section 32 of the information processing apparatus 3 controls the player object PO according to an operation performed on the input section 16 by the user (step S1). When the player object PO has reached a predetermined position (a position at which the read determination object 60 is positioned) in the virtual space (step S2), a read instruction is issued from the object control section 32 to the communication control section 33. When the read instruction is issued from the object control section 32 to the communication control section 33, an operation of the user (for example, pressing of the "A" button) may be needed. In response to the read instruction, the communication control section 33 starts communication with the tag 2 (step S3). Specifically, the communication control section 33 controls the communication chip 12 to cause the communication section 11 to transmit radio wave. When the tag 2 exist in a range in which communication can be performed, electromotive force is generated in the tag 2 by the radio wave transmitted from the information processing apparatus 3, and the information stored in the tag 2 is read by the communication control section 33 due to the generated electromotive force (step S4). The information read by the communication control section 33 is delivered to the object control section 32 (step S5). Then, the communication control section 33 ends the communication with the tag 2 (step S6). That is, radio wave is not transmitted from the information processing apparatus 3. After the communication is started in step S3 and the information is read from the tag 2, radio wave may be continuously transmitted from the information processing apparatus 3. In this case, after the player object PO has reached the predetermined position, the information processing apparatus 3 is allowed to read the information stored in the tag 2 at any time.

When the object control section 32 obtains the information read from the tag 2, the object control section 32 replaces the player object PO with the tag object TO associated with the read information (step S7). The mission is started by using the tag object TO after the replacement, as an operation subject to be operated by the user (step S8).

After the operation subject to be operated by the user is changed from the player object PO to the tag object TO, the object control section 32 controls the tag object TO according to an operation performed on the input section 16 by the user (step S9). When a predetermined time period has elapsed after the start of the mission, or when the purpose has been attained, the mission ends (step S10). When the mission is cleared (the purpose is attained) within the predetermined time period, the user may be provided with various bonuses for the game. The "bonuses for the game" may be bonuses for advantageously proceeding with the game. For example, when the mission is cleared, items used in the game or money usable in the game may be provided, or a parameter (for example, attribute value representing physical strength or the like, or level) of the player object or the tag object that is an operation subject to be operated by the user may be improved. On the other hand, when the mission has not been cleared within the predetermined time period (for example, when the predetermined time period has elapsed before the purpose is attained), the user cannot obtain the bonus such as the items, and the mission ends.

When the mission has ended, the tag object TO is replaced with the player object PO (step S11). The player object PO is controlled again according to an operation performed on the input section 16 by the user (step S12).

Thus, in the present embodiment, when the player object PO operated by the user has reached a predetermined position in the virtual space, the information stored in the tag 2 can be read. That is, before the player object PO reaches the predetermined position, even if the tag 2 is placed at a position (the placement portion for the tag 2 provided in the information processing apparatus 3) at which communication can be performed, the information processing apparatus 3 cannot read the information stored in the tag 2. When the player object PO has reached the predetermined position, the information processing apparatus 3 can read the information stored in the tag 2. Specifically, before the player object PO reaches the predetermined position, radio wave for allowing the information stored in the tag 2 to be read is not transmitted from the information processing apparatus 3. Further, before the player object PO reaches the predetermined position, the communication chip 12 does not operate, or the operation of the communication chip 12 is limited. When the player object PO has reached the predetermined position, the information processing apparatus 3 starts transmitting radio wave for allowing the information stored in the tag 2 to be read. Radio wave is not physically transmitted from the information processing apparatus 3 or the operation of the communication chip 12 is limited before the player object PO reaches the predetermined position, thereby reducing power consumption.

In the example of the process described above, information is read from the tag 2. However, information may be written into the tag 2.

For example, in a state where the player object PO has been replaced with the tag object TO, customization is performed for the tag object TO, and information of the customization may be stored in the tag 2. For example, while the mission is being performed, the tag object TO obtains a predetermined item (such as weapon, equipment, or clothes used in the game) or capability. Further, when the user operates the tag object TO to purchase a predetermined item in the virtual space, the tag object TO obtains the predetermined item. Thus, the information (customization information) representing the item or capability obtained by the tag object TO being operated may be written in the tag 2.

Figure 11:
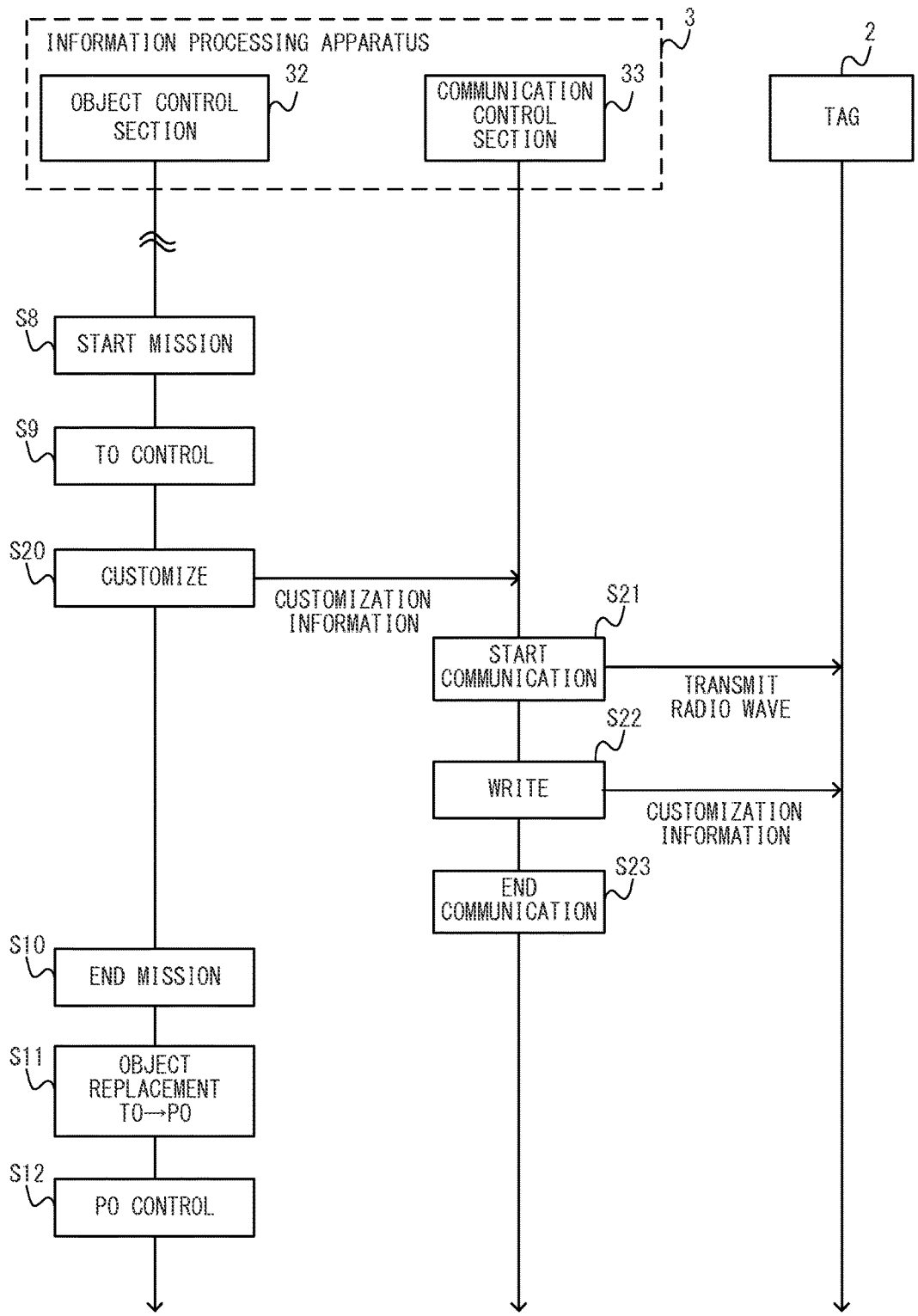
FIG. 11 is a diagram illustrating a non-limiting example of a flow of a process of writing information into the tag 2.

FIG. 11 shows an example of a flow of a process of writing information into the tag 2. In FIG. 11, the same process steps as shown in FIG. 10 are denoted by the same reference numerals, and description thereof is not given.

As shown in FIG. 11, steps S1 to S7 in FIG. 10 are omitted. While step S1 to step S8 are performed, and the tag object TO is operated by the user, the tag object TO is customized (step S20). When the tag object TO has been customized, the communication control section 33 starts communication with the tag 2 according to, for example, a writing instruction being issued from the user (step S21). Then, the customization information is written into the tag 2 (step S22). Thus, the information of the customization performed for the tag object TO is written into the readable and writable area of the tag 2. When the customization information has been written into the tag 2, the communication control section 33 ends the communication process. The following process steps are the same as shown in FIG. 10.

The customization information having been written into the tag 2 as well as the character information is read when the tag 2 is subsequently read. That is, in a case where the process shown in FIG. 11 has been ended, the player object PO reaches the predetermined position again, and the tag 2 can be read, the customization information as well as the character information is read in step S4 in FIG. 10. Then, in step S7, the customized tag object TO appears in the virtual space.

Before the player object PO is replaced with the tag object TO, the user may operate the player object PO to customize the player object PO. When the player object PO is customized in a state where the user is operating the player object PO (in a state where the operation subject to be operated by the user is the player object PO), the customization information may be reflected in the tag object TO. For example, in a case where the player object PO is customized by the user so as to additionally have predetermined equipment, when the player object PO is replaced with the tag object TO, the game may be played in a state where the tag object TO additionally has the predetermined equipment. That is, the user may be allowed to change an object to be operated by the user from the player object PO to the tag object TO while maintaining the equipment so as to be the same between before and after reading of the tag 2.

Figure 12:
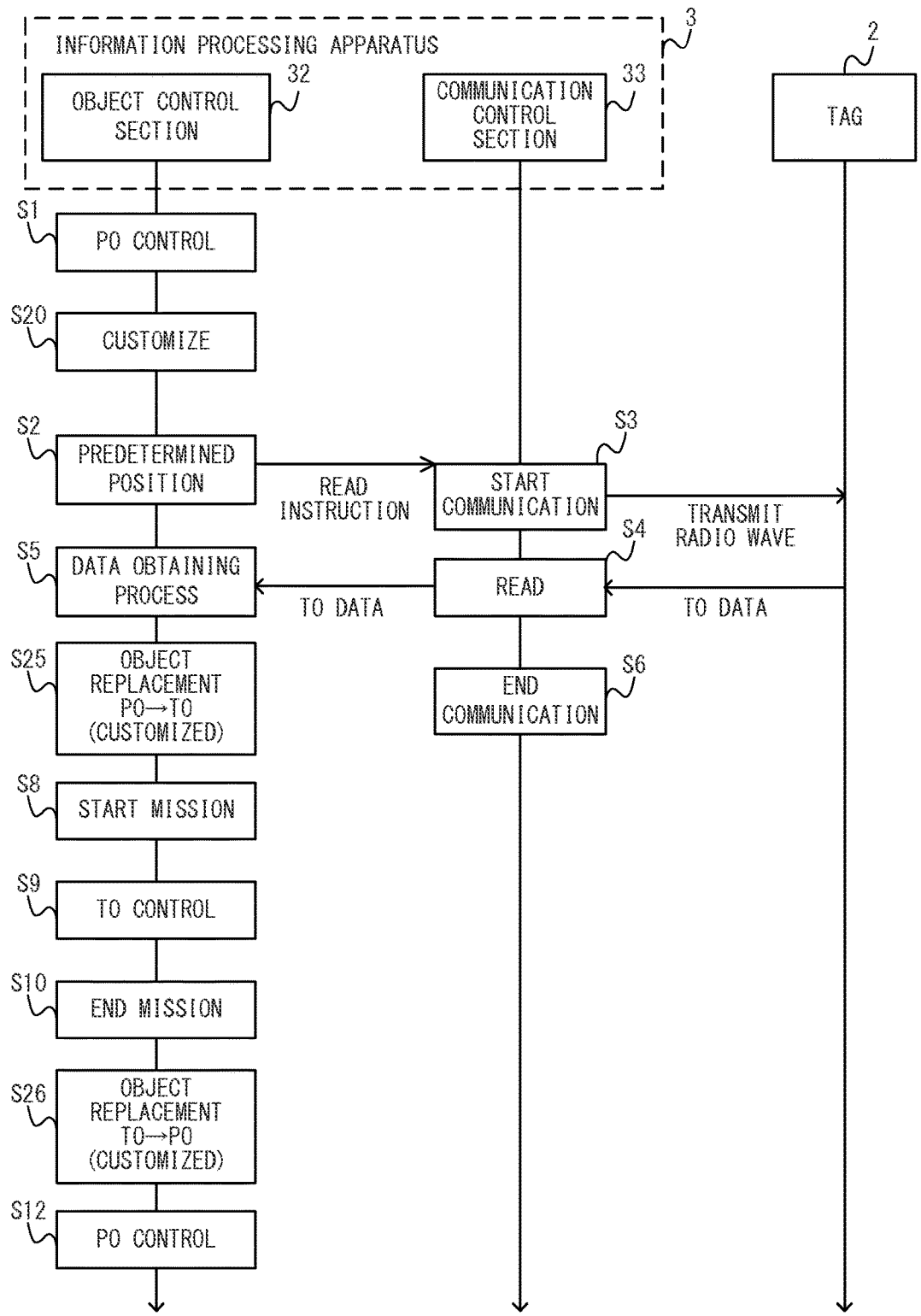

FIG. 12 shows an example of a flow of a process for maintaining the customization information for the player object PO also after the player object PO has been replaced with the tag object TO. In FIG. 12, the same process steps as shown in FIG. 10 and FIG. 11 are denoted by the reference numerals, and description thereof is not given.

As shown in FIG. 12, while the player object PO is controlled based on an operation performed on the input section 16 by the user (step S1), the player object PO is customized (step S20). The customization may be any of changes, performed for the player object PO in a default state according to an operation performed by the user, which include, for example, addition, deletion, and change of the equipment of the player object PO, and addition, deletion, and change of capability of the player object PO. The customization information for the player object PO is stored in, for example, the memory 14 or the program storage section 15 of the information processing apparatus 3. Next, when the player object PO reaches the predetermined position (step S2), the information stored in the tag 2 is read (step S4), and the player object PO is replaced with the tag object TO (step S25). The customization performed for the player object PO in step S20 is reflected in the tag object TO with which the player object PO has been replaced. The mission is started by using the customized tag object TO (step S8). When the mission ends, the tag object TO is replaced with the player object PO (step S26). At this time, the information customized in step S20 is maintained, and the customized player object PO appears again in the virtual space.

As described above, in the present embodiment, when the player object PO operated by the user reaches a predetermined position in the virtual space, the information processing apparatus 3 is allowed to read the information stored in the tag 2. In a state where the information processing apparatus 3 is allowed to read the information stored in the tag 2, when the user places the tag 2 at the placement portion (place at which communication with the tag 2 can be performed) of the information processing apparatus 3, the information processing apparatus 3 can read the information stored in the tag 2. When the information processing apparatus 3 has read the information stored in the tag 2, the player object PO is replaced with the tag object TO associated with the read information. That is, the operation subject to be operated by the user is changed from the player object PO to the tag object TO associated with the information stored in the tag 2. Thus, in the present embodiment, a virtual character that is similar to a figure in an actual world is caused to appear in the virtual space, and the player object PO is replaced with the virtual character to allow the game to be played.

In the above embodiment, the information stored in the tag 2 is read, whereby the player object PO is replaced with the tag object TO. That is, the player object PO disappears from the virtual space, the tag object TO instead thereof appears in the virtual space, and the operation subject to be operated by the user is changed to the tag object TO. In another embodiment, the tag object TO may appear in the virtual space without replacing the player object PO with the tag object TO, and the operation subject to be operated by the user may be changed to the tag object TO. That is, the information stored in the tag 2 is read, whereby the tag object TO may appear in the virtual space in a state where the player object PO remains in the virtual space, and the operation subject to be operated by the user may be changed from the player object PO to the tag object TO. Further, before the information stored in the tag 2 is read, the tag object TO may exist in the virtual space, and when the information stored in the tag 2 is read, the operation subject to be operated by the user may be changed from the player object PO to the tag object TO. That is, both the player object PO and the tag object TO may originally exist in the virtual space, and, when the player object PO reaches the predetermined position and the information stored in the tag 2 is read, the operation subject to be operated by the user may be changed from the player object PO to the tag object TO.

Further, in the above embodiment, according to the player object PO having reached the predetermined position (position of the read determination object 60), the information processing apparatus 3 is allowed to read the information stored in the tag 2. In another embodiment, according to the player object PO satisfying a predetermined condition, the information processing apparatus 3 may be allowed to read the information stored in the tag 2. For example, when the player object PO has entered a predetermined state, the predetermined condition may be determined to be satisfied. For example, when the player object PO has performed a predetermined action, the predetermined condition may be determined to be satisfied. Further, in a case where the player object PO has obtained a predetermined item, or in a case where a value representing points obtained by a predetermined item being obtained, has reached a predetermined value, the predetermined condition may be determined to be satisfied. Further, for example, when an attribute value (physical strength value (hit point), special capability value, or the like) of the player object PO is less than (or greater than) or equal to a predetermined value, or when a value representing points obtained (or lost) by the player object PO in the game is greater than (or less than) or equal to a predetermined value, the predetermined condition may be determined to be satisfied. Further, when the equipment of the player object PO have been added, changed, or deleted, or when the capability of the player object PO has been improved (for example, the level is enhanced), the predetermined condition may be determined to be satisfied.

Only while the player object PO satisfies the predetermined condition, the information processing apparatus 3 may be allowed to read the information stored in the tag 2. In this case, whether or not the player object PO satisfies the predetermined condition is repeatedly determined. When the player object PO does not satisfy the predetermined condition, the information processing apparatus 3 cannot read the information stored in the tag 2. For example, as described above, only while the player object PO is in the predetermined range, the information processing apparatus 3 may be allowed to read the information stored in the tag 2. Further, for example, only while the player object PO has a predetermined item, the information processing apparatus 3 may be allowed to read the information stored in the tag 2. Further, only in a period in which an item obtained or used by the player object PO is effective, the information processing apparatus 3 may be allowed to read the information stored in the tag 2. Further, only while the attribute value of the player object PO is greater than (or less than) or equal to a predetermined value, the information processing apparatus 3 may be allowed to read the information stored in the tag 2.

Further, once the player object PO has satisfied the predetermined condition, the information processing apparatus 3 may be thereafter allowed to read the information stored in the tag 2. For example, once the player object PO has obtained a predetermined item, the information processing apparatus 3 may be thereafter allowed to read the information stored in the tag 2. For example, once a level (status) of the player object PO has become higher than or equal to a predetermined value, the information processing apparatus 3 may be thereafter allowed to read the information stored in the tag 2. Further, for example, in a game in which a plurality of stages are cleared stepwise, in a case where the game is cleared up to a predetermined stage, after the following stages, the information processing apparatus 3 may be allowed to read the information stored in the tag 2. Further, once the player object PO has satisfied the predetermined condition, even if the predetermined condition is not satisfied after that, the information processing apparatus 3 may be allowed to read the information stored in the tag 2.

Further, the information processing apparatus 3 can make wireless or wired connection to a local area network or the Internet, and whether or not the predetermined condition has been satisfied may be determined according to a state of the connection to the local area network or the Internet. For example, when the information processing apparatus 3 is wirelessly connected to the local area network or the Internet, whether or not the predetermined condition has been satisfied may be determined according to a wireless state of radio wave.

Further, whether or not the predetermined condition has been satisfied may be determined according to an operation performed on the input section 16. For example, when a predetermined operation on a button and/or a touch panel has been performed, the predetermined condition may be determined to be satisfied. Further, when a predetermined operation has been performed on another input device (button operation, operation on the touch panel, operation of moving the input device itself, or the like has been performed), the predetermined condition may be determined to be satisfied. For example, when a microphone, a camera, or a physical sensor such as an acceleration sensor, an angular velocity sensor, or a magnetic sensor is connected to (or incorporated in) the information processing apparatus 3, whether or not the predetermined condition has been satisfied may be determined based on a signal detected by the sensor.

Further, in the above embodiment, when the player object PO has reached the predetermined position, radio wave is transmitted or the communication chip 12 operates such that the information processing apparatus 3 can read the information stored in the tag 2. That is, when the player object PO has satisfied the predetermined condition, the near field communication with the tag 2 can be made physically possible. In another embodiment, the tag 2 and the information processing apparatus 3 may be maintained so as to be able to physically communicate with each other, regardless of whether or not the player object PO satisfies a predetermined condition. In this case, before the player object PO satisfies the predetermined condition, the information processing apparatus 3 does not obtain the information stored in the tag 2, and after the player object PO has satisfied the predetermined condition, the information processing apparatus 3 may obtain the information stored in the tag 2. That is, the control may be performed such that, before the player object PO satisfies the predetermined condition, although radio wave is physically transmitted from the information processing apparatus 3 and the information processing apparatus 3 reads the information stored in the tag 2, the information read from the tag 2 is not obtained by the application, and the process (for example, object replacement process) based on the information is not performed. On the other hand, after the player object PO has satisfied the predetermined condition, the information read from the tag 2 is obtained by the application and the process based on the information is performed.

Further, in the above embodiment, when the information stored in the tag 2 has been read, a predetermined process is performed according to the read information. As the predetermined process, a process of replacing the player object PO with the tag object associated with the read information, or a process of performing the mission associated with the read information is performed.

Further, in another embodiment, when the information stored in the tag 2 has been read, a predetermined process based on the player object PO may be performed. For example, as the predetermined process, a process of replacement of the player object PO as described above (an object with which the player object PO is replaced is different depending on a type, a level, or equipment of the player object PO) may be performed. Further, as the predetermined process, a process of performing the mission based on a type, a level, or equipment of the player object PO may be performed.

Detail of Process According to First Embodiment

Figure 13:
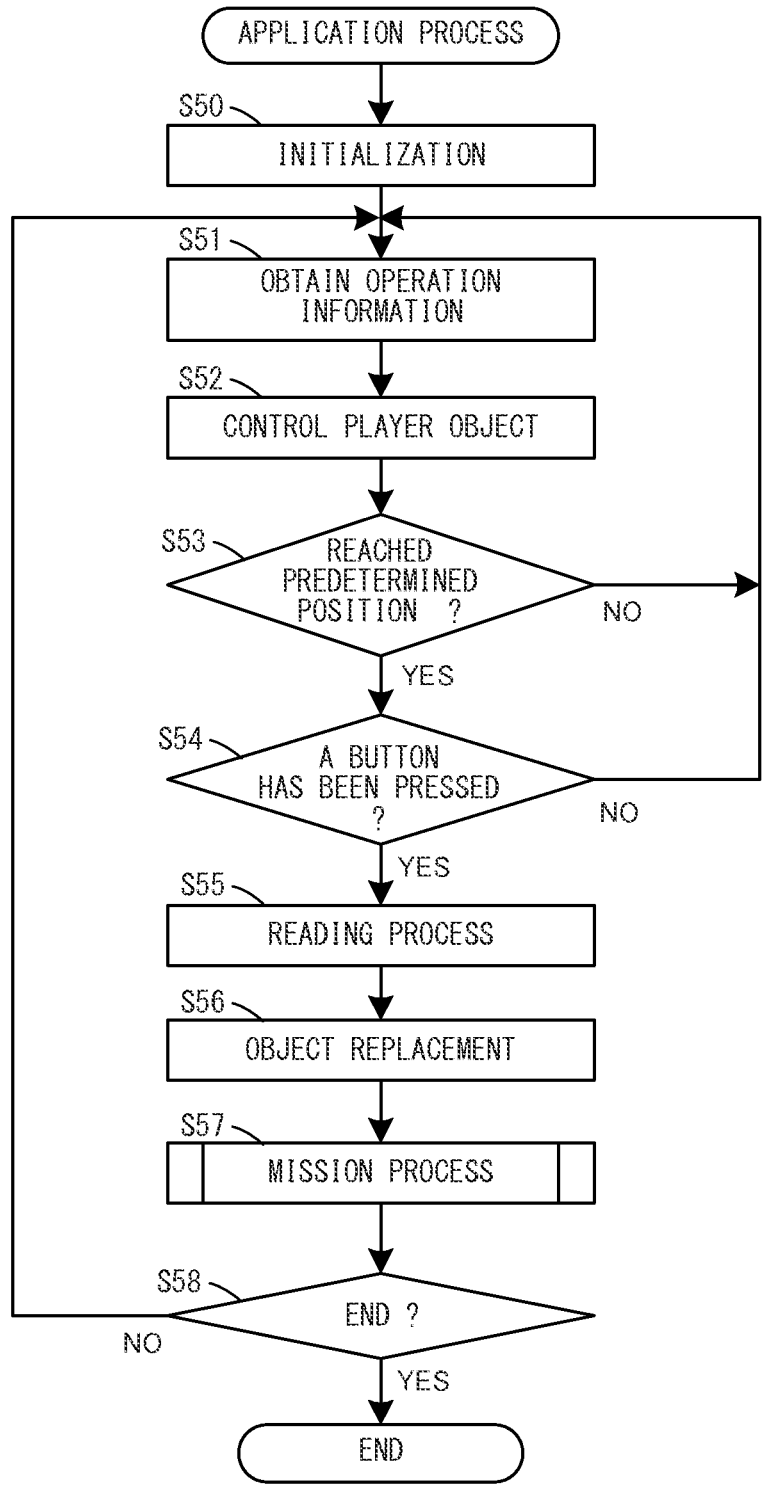
FIG. 13 is a flow chart showing a non-limiting example of an application process according to the first embodiment.

Next, an example of a specific process for executing the application, according to the first embodiment, to be performed by the information processing apparatus 3 will be described. FIG. 13 is a flow chart showing an example of an application process according to the first embodiment. The CPU 13 loads, into the memory 14, the application program stored in the program storage section 15, at predetermined timing (for example, timing before an instruction from the user is issued or the application is started), and executes the program to perform the process shown in FIG. 13.

As shown in FIG. 13, in step S50, the CPU 13 performs initialization. Specifically, the CPU 13 defines the virtual space, and positions, in the virtual space, the player object PO, the read determination object 60, the virtual camera, other characters, and the like. Next, the CPU 13 obtains the operation information (step S51). Specifically, the CPU 13 obtains, from the input section 16, a signal based on an operation performed on the input section 16.

Next, the CPU 13 controls the player object PO based on the operation information obtained in step S51 (step S52). Specifically, the CPU 13 updates a position of the player object PO in the virtual space or causes the player object PO to act, according to the operation information.

Subsequent to step S52, the CPU 13 determines whether or not the player object PO has reached a predetermined position (step S53). For example, the CPU 13 determines whether or not the player object PO and the read determination object 60 have collided with each other. Specifically, the CPU 13 determines whether or not the player object PO has entered a predetermined range including the read determination object 60, based on a position of the player object PO and a position of the read determination object 60.

When the player object PO is determined to have reached the predetermined position (step S53: YES), the CPU 13 determines whether or not the A button of the input section 16 has been pressed (step S54). When the player object PO has not reached the predetermined position (step S53: NO) or when the A button of the input section 16 has not been pressed (step S54: NO), the CPU 13 performs the process step of step S51 again. The process of step S51 to step S54 is performed at predetermined time intervals (for example, once in 1/60 seconds), whereby a state where the player object PO moves in the virtual space is displayed on a screen of the display section. The process step of step S54 may not be performed. That is, also in a case where the A button is not pressed, when the player object PO has reached the predetermined position, the subsequent step S55 may be performed.

When the A button of the input section 16 has been pressed (step S54: YES), the CPU 13 performs reading process (step S55). Specifically, the CPU 13 transmits, to the communication chip 12, an instruction for transmitting radio wave. The communication chip 12 transmits radio wave according to the instruction from the CPU 13. By the radio wave being transmitted, electromotive force is generated in the tag 2, thereby allowing the CPU 13 to read information from the tag 2.

In step S55, the CPU 13 then performs object replacement after the information has been read from the tag 2 (step S56). Specifically, in step S56, the CPU 13 temporarily eliminates the player object PO from the virtual space (does not display the player object PO), and causes the tag object TO associated with the information read from the tag 2 to appear in the virtual space. A plurality of missions are displayed on the screen according to the type of the tag object TO that has appeared, and the user is caused to select the mission to be performed. When a predetermined operation (for example, pressing of the button for cancellation) is performed in step S56 or when a predetermined time period has elapsed in step S56, the CPU 13 does not advance the process to the subsequent step S57, and returns the process to step S51.

FIG. 15 is a diagram illustrating an example of the information read from the tag 2, and types of the tag object and the missions which are associated with the information.

As shown in FIG. 15, for example, when character information A is obtained from the tag 2, the CPU 13 selects a character A as the tag object TO, and selects missions M1 to M3 as the corresponding mission. Further, when character information B is obtained from the tag 2, the CPU 13 selects a character B as the tag object TO, and selects missions M1, M4, M5 as the corresponding mission. Further, when character information C is obtained from the tag 2, the CPU 13 selects a character C as the tag object TO, and selects missions M6 to M8 as the corresponding mission. The number of the characters associated with the character information read from the tag 2 may be one as shown in FIG. 15, or plural. That is, the character information read from the tag 2 and the corresponding character may be associated with each other in a one-to-one correspondence or the character information read from the tag 2 may be associated with a plurality of characters. Further, the number of the missions associated with the character information read from the tag 2 may be plural as shown in FIG. 15 or may be one. Further, the characters or the missions associated with certain character information and the characters or the missions associated with other character information may be partially or entirely common to each other. Data for each character (data or image data representing a shape of the character, data representing equipment and attribute, or the like) may be read from (the program storage section 15 of) the information processing apparatus 3. Further, data (program or data to be used for executing the program) for performing the mission may be read from the information processing apparatus 3. Further, data for each character or data for the mission may be read from the tag 2. Further, the CPU 13 may obtain data for the character and/or data for the mission which are associated with the character information read from the tag 2, via the Internet or a local area network from an external storage device.

When the mission is selected by the user, the CPU 13 performs a mission process (step S57). In the mission process of step S57, the mission game may be performed in a virtual space different from the virtual space in which the player object PO has been controlled, or the mission game may be performed in the same virtual space as that in which the player object PO has been controlled. Hereinafter, the mission process of step S57 will be described in detail with reference to FIG. 14.

Figure 14:
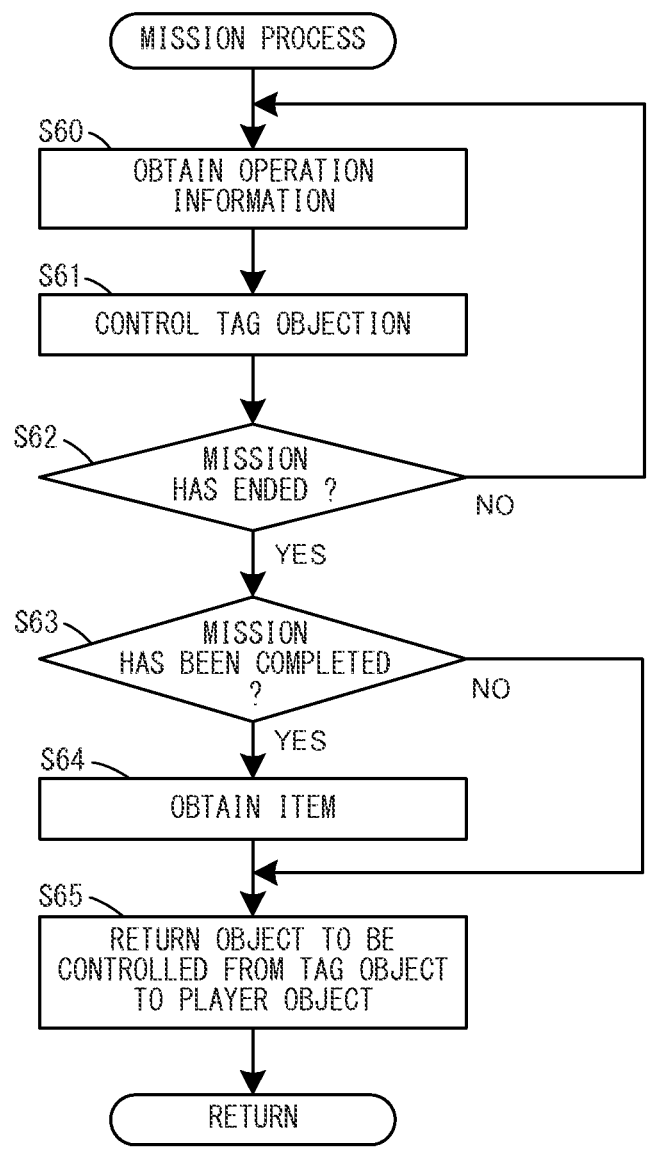
FIG. 14 is a diagram illustrating a non-limiting example of a detailed flow chart of a mission process of step S57 shown in FIG. 13.

FIG. 14 is a diagram illustrating in detail an example of a flow chart of the mission process of step S57 in FIG. 13. As shown in FIG. 14, when the mission is started, the CPU 13 obtains operation information (step S60) as in step S51. Specifically, the CPU 13 obtains, from the input section 16, a signal based on an operation performed on the input section 16.

Subsequently, the CPU 13 controls the tag object TO based on the operation information obtained in step S60 (step S61). Thus, for example, the tag object TO moves in the virtual space or performs a predetermined action. Next, the CPU 13 determines whether or not the mission has ended (step S62). When the mission has not been ended (step S62: NO), the CPU 13 performs the process step of step S60 again. The process of step S60 to step S62 is repeatedly performed at predetermined time intervals, whereby the tag object TO is operated by the user from the start of the mission to the end thereof, and the mission is performed by using the tag object TO. As the condition for ending the mission in step S62, for example, the condition that a predetermined time has elapsed after the start of the mission, or the condition that a predetermined result has been derived in the mission, may be used.

When the mission has been ended (step S62: YES), the CPU 13 determines whether or not the mission has been completed (step S63). As the condition for completing the mission, for example, obtaining of an item by the tag object TO within a predetermined time period, defeating of an opponent within a predetermined time period, arrival at a destination within a predetermined time period, obtaining of a predetermined or higher point within a predetermined time period may be used. When the mission is determined to have been completed (step S63: YES), a predetermined item is obtained (step S64). In step S64, instead of or in addition to the item, another bonus (for example, enhancement of a parameter of the player object, money usable in the game) for advantageously proceeding with the game may be obtained.

When the mission has not been completed (step S63: NO), or when the process of step S64 has been performed, the CPU 13 returns an object to be controlled from the tag object TO to the player object PO (step S65). Specifically, the CPU 13 eliminates (does not display) the tag object TO from the virtual space, and causes the player object PO to appear in the virtual space again. This is the end of the process, shown in FIG. 14, performed by the CPU 13.

Returning to FIG. 13, the CPU 13 determines whether or not the game process is to be ended after the mission process of step S57 (step S58). When the game process is not to be ended (step S58: NO), the CPU 13 performs the process step of step S51 again. On the other hand, when the game process is to be ended (step S58: YES), the CPU 13 ends the process shown in FIG. 13.

As described above, in the application according to the first embodiment, when a player object (user object) controlled according to an operation performed by the user reaches a predetermined position in the virtual space, the information stored in the tag 2 can be read. When the information stored in the tag 2 has been read, the player object is replaced with the tag object TO associated with the information read from the tag 2.

In the above embodiment, when the information stored in the tag 2 has been read, the player object PO is replaced with the tag object TO. In another embodiment, for example, when the information stored in the tag 2 has been read, the remaining number of the player objects PO may be increased. For example, in a case where the number of the player objects PO is set as a predetermined number, when the player object PO is defeated by an opponent character or fails in a predetermined mission, the remaining number of the player objects PO is reduced, and the game is restarted. When the remaining number of the player objects PO becomes zero, the game is over. In such a game, when the information stored in the tag 2 has been read, the remaining number of the player objects PO may be increased.

Second Embodiment

Figure 16:
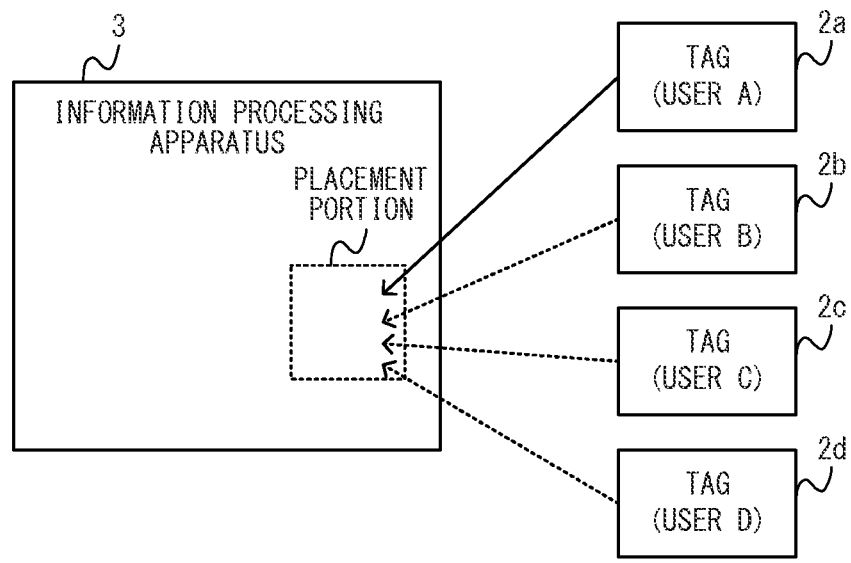
FIG. 16 is a diagram illustrating a non-limiting example of an outline of an application according to a second embodiment.

Next, an application, according to a second embodiment, performed by the information processing apparatus 3 will be described. In the second embodiment, for example, a quiz game in which one or more users participate is performed. FIG. 16 is a diagram illustrating an outline of the application according to the second embodiment. As shown in FIG. 16, in the second embodiment, it is basically assumed that the game is played by a plurality of users, and each user has the tag 2. For example, a user A has a tag 2*a*, a user B has a tag 2*b*, a user C has a tag 2*c*, and a user D has a tag 2*d*. Each user is associated with character information stored in the tag 2. Each user places her/his own tag 2 at the placement portion of the information processing apparatus 3 when answering a presented question. On the rear side of the placement portion, for example, the antenna 11 is arranged. When the tag 2 is placed at the placement portion, the information processing apparatus 3 can communicate with the tag 2, and can read information stored in the tag 2.

Figure 17:
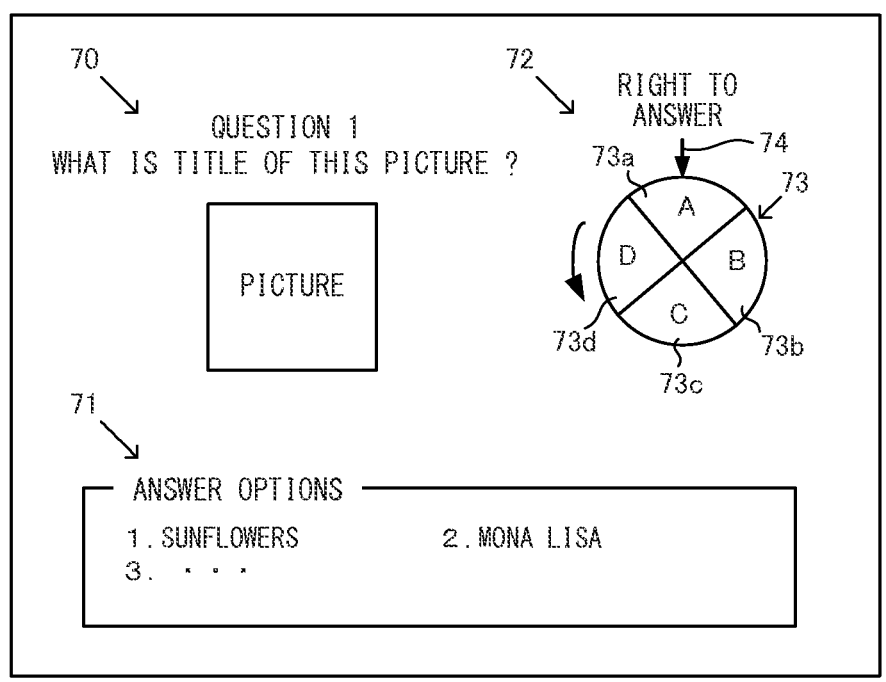
FIG. 17 is a diagram illustrating a non-limiting example of an image displayed on a display unit in the case of an application according to the second embodiment being executed.

FIG. 17 is a diagram illustrating an example of an image displayed on the display unit in the case of the application according to the second embodiment being executed.

As shown in FIG. 17, on a screen of the display unit (which may be the display section 17 or another display unit), an image 70 for presenting a question, an image 71 for providing answer options for the question, and a right-to-answer display image 72 for indicating a right to answer, are displayed. When the quiz game is started, a question is displayed, and one of the plural users selects an answer from among the plural answer options to answer the displayed question. The answer to the question is made by using the input section 16 (input button, touch panel, or the like).

In the present embodiment, each user is allowed to answer the question only in a period (answer reception period) in which the user has a right to answer. Specifically, on the screen, a disk 73 is displayed. The disk 73 is divided into an area 73a for the user A, an area 73b for the user B, an area 73c for the user C, and an area 73d for the user D. A user, among the user A to the user D, who currently has a right to answer is indicated by an arrow 74 representing the "right to answer". In the state shown in FIG. 17, since the arrow 74 indicates the area 73a, the user A has a right to answer. For example, the disk 73 rotates counterclockwise at a constant speed, and the arrow 74 constantly indicates the upper end of the disk 73. Therefore, the area indicated by the arrow 74 is changed such that the area 73a, the area 73b, the area 73c, and the area 73d are sequentially indicated by the arrow 74 in order, respectively. That is, in the example shown in FIG. 17, the right to answer is sequentially shifted among the user A, the user B, the user C, and the user D in order, respectively. In order to indicate that the right to answer is shifted among the users, any other image instead of the disk 73 may be used. For example, a straight-line-like image representing a gauge or the like may be used to indicate that the right to answer is shifted among the users. Further, a predetermined object image may be moved to an area associated with each user, to indicate that the right to answer is shifted. Further, another method other than an image may be used to indicate that the right to answer is shifted.

Figure 18:
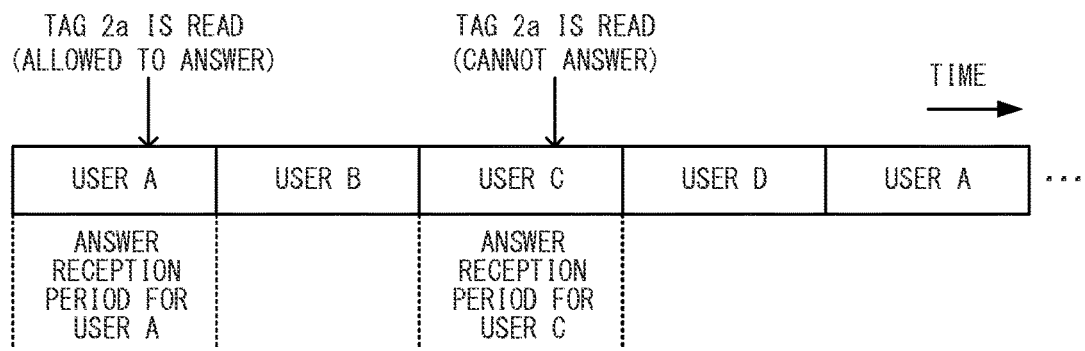
FIG. 18 is a diagram illustrating a non-limiting example of an answer reception period set for each user.

FIG. 18 is a diagram illustrating the answer reception period set for each user. As shown in FIG. 18, the answer reception period for each user is set such that only one user has a right to answer at a certain time. In the answer reception period for the user A, in a case where information stored in the tag 2a of the user A has been read, the user A is allowed to answer the presented question. However, for example, in the answer reception period for the user C, only the user C is allowed to answer. The information stored in the tag 2a of the user A can be read in the answer reception period for the user C. However, even if the information stored in the tag 2a is read, the user A cannot answer the question.

That is, even if each user knows the answer to the presented question, while the user does not have a right to answer, the user cannot answer the question. In a case where the user has a right to answer and the user knows the answer to the question, the user places her/his own tag 2 at the placement portion. Then, the user selects an answer from among plural answer options, thereby answering the question. When the user's answer is correct, the user can obtain a point. When the user's answer is incorrect, the user cannot obtain a point.

On the other hand, while the user has no right to answer, even if the user knows an answer to the question, the user cannot answer. In a case where the user who has no right to answer places her/his own tag 2 at the placement portion, a penalty is imposed on the user.

Figure 19:
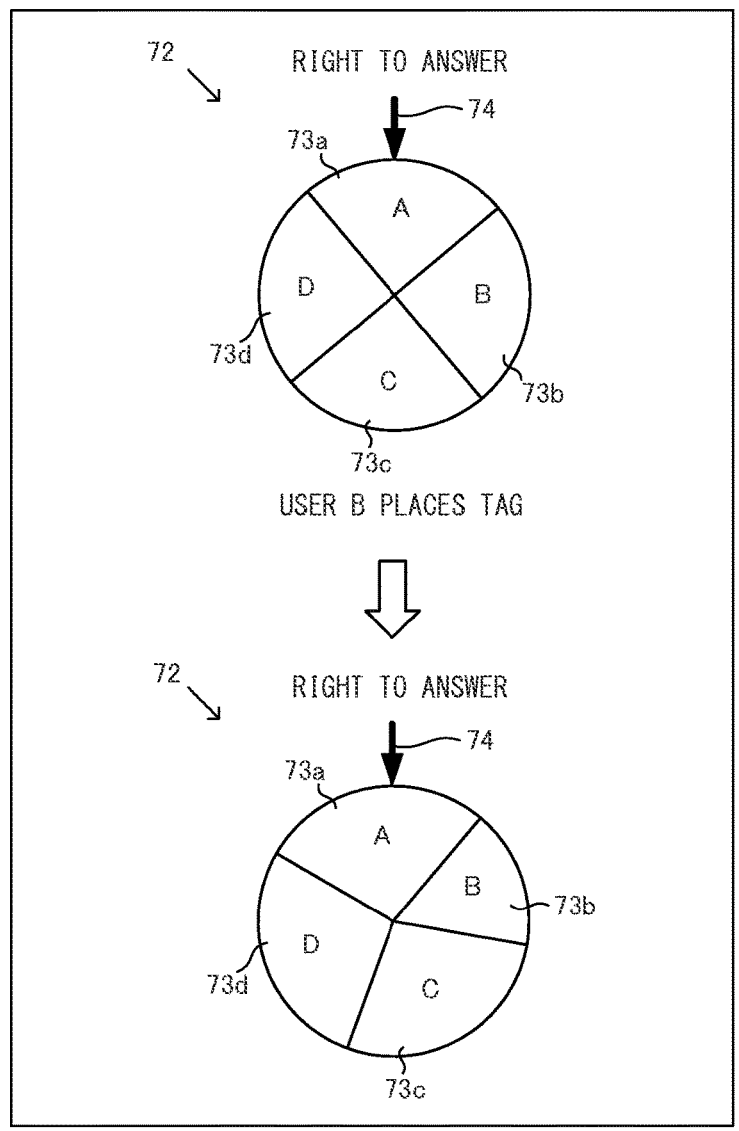
FIG. 19 is a diagram illustrating a non-limiting example of a penalty imposed on a user B when the user B places a tag 2b of the user B at a placement portion in the case of the user B having no right to answer.

FIG. 19 is a diagram illustrating an example of the penalty imposed on the user B when the user B places her/his own tag 2b at the placement portion in the case of the user B having no right to answer. As shown in FIG. 19, for example, in a case where the user A currently has the right to answer (in a case where the arrow 74 representing the right to answer indicates the area 73a), when the user B places the tag 2b at the placement portion of the information processing apparatus 3, the information stored in the tag 2b is read, and the area 73b representing the right to answer for the user B is narrowed. Since the disk 73 rotates at a constant speed, when the area 73b is narrowed, a period (period in which the user B has the right to answer) in which the user B is allowed to answer is shortened. Therefore, the user B has a disadvantage. Thus, in a case where a user having no right to answer places her/his own tag 2 at the placement portion, a process disadvantageous to the user is performed. As is apparent from this, in the second embodiment, at least when a question is presented, the information processing apparatus 3 can read the information stored in the tag 2 (that is, radio wave can be transmitted).

In a case where a penalty is imposed, the penalty may be canceled under a predetermined condition. For example, in a case where a predetermined time period elapses since the penalty has been imposed, the penalty may be canceled. That is, in a case where a predetermined time period elapses since the area 73b for the user B has been narrowed, the size of the area 73b may be restored to the original size. Further, for example, in a case where the user B gives a correct answer to the following question or questions, the size of the area 73b may be restored to the original size. In this case, each time the user B gives a correct answer, the size of the area 73b is gradually increased, and when the user B gives correct answers for a predetermined number of questions, the size of the area 73b may be restored to the original size.

A user having a right to answer when the disk 73 starts to rotate, is determined at random for each question. That is, if the same user firstly has a right to answer every time a question is presented, the user has an advantage as compared to the other users. Therefore, in order to ensure fairness, a user who is to firstly have a right to answer is determined at random for each question. For example, when a question is presented, the information processing apparatus 3 determines, by lot, a user who is to firstly have a right to answer, by using a random number, and arranges the other users in a predetermined order. Each user has the same winning rate in this lot. For example, in a case where the information processing apparatus 3 determines the user B, as a user who is to firstly have a right to answer, with a probability of 25%, the areas of the disk 73 is rearranged such that the right to answer is sequentially shifted among the user B, the user C, the user D, and the user A in order, respectively. As a penalty imposed when a user places her/his own tag 2 at the placement portion while the user has no right to answer, reduction of the winning rate in this lot may be used. Further, the order in which the right to answer is shifted may not be determined at random, and may be fixed.

Detail of Process According to Second Embodiment

Figure 20:
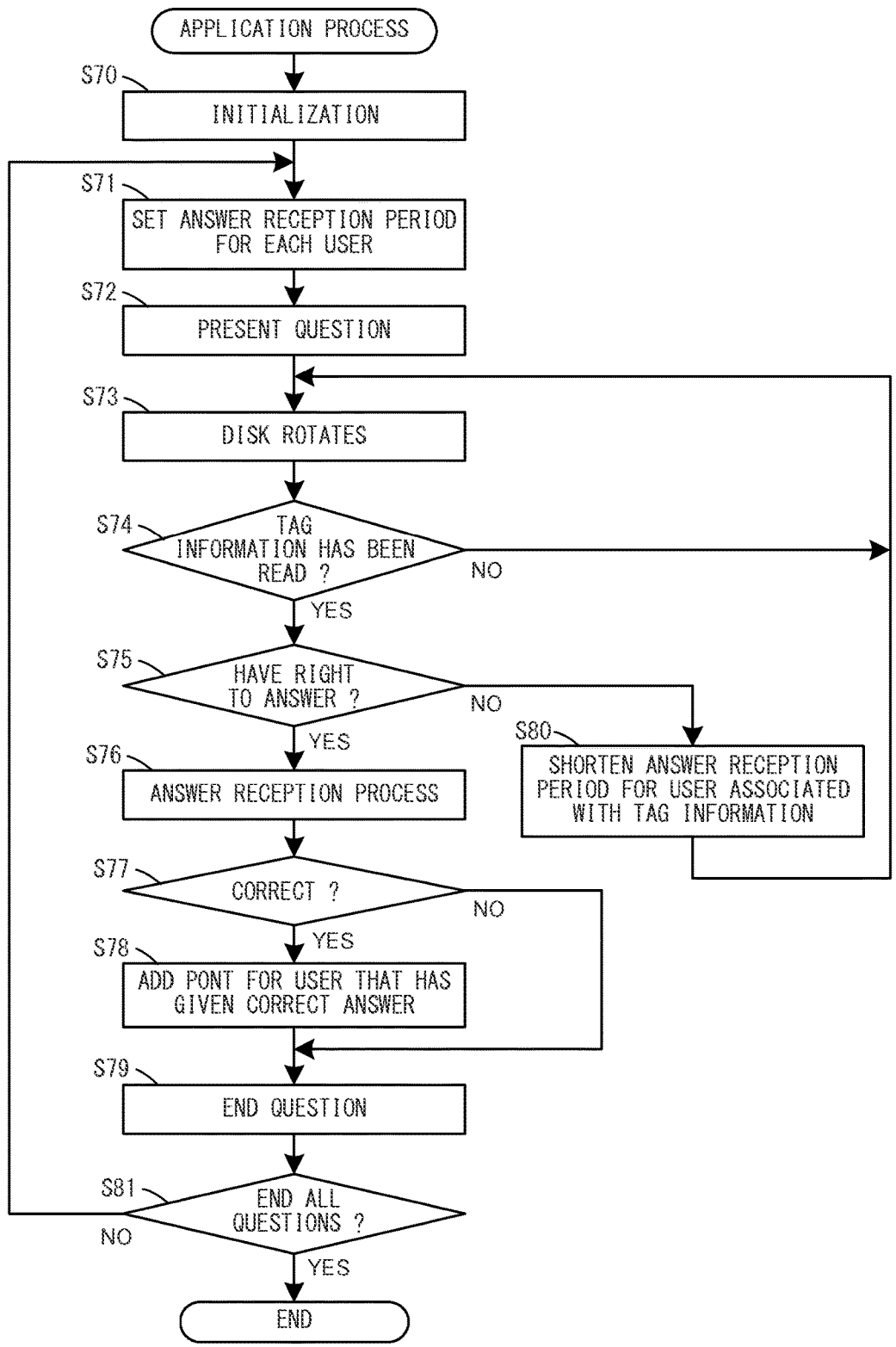
FIG. 20 is a flow chart showing a non-limiting example of an application process according to the second embodiment.

Next, an example of a specific process for executing the application, according to the second embodiment, to be performed by the information processing apparatus 3 will be described. FIG. 20 is a flow chart showing an example of the application process according to the second embodiment. The CPU 13 loads the application program into the memory 14 at predetermined timing (for example, timing before instruction from a user is issued or the application is started) and executes the program to perform the process shown in FIG. 20.

As shown in FIG. 20, in step S70, the CPU 13 performs initialization. Specifically, the CPU 13 sequentially reads the tags 2 of the respective users, and sets characters for the users associated with the plurality of the tags 2, respectively, and displays the characters for the respective users on the display unit (step S70). Next, the CPU 13 sets the answer reception period for each user (step S71). Specifically, the CPU 13 determines the length of the answer reception period for each user in step S71, and sets the order in which the answer reception periods are arranged. The CPU 13 sets the answer reception period for each user according to a penalty imposed on the user. For example, when no penalty is imposed on each user, the CPU 13 sets the length of the answer reception period to be the same among the users. Next, the CPU 13 uses a random number to determine, by lot, a user who is to firstly have a right to answer (a user for which the answer reception period is primarily set). In a case where the CPU 13 determines a user who is to firstly have a right to answer, the order in which the users have a right to answer is determined such that the right to answer is shifted among the users in a predetermined order for the users who are to secondly and thereafter have the right to answer. The CPU 13 arranges the areas associated with the respective users such that the right to answer is shifted in the determined order, and displays the disk 73 as shown in FIG. 17 on the display unit.

Next, the CPU 13 operates to present a question (step S72), and rotates the disk 73 by a predetermined angle (step S73). Next, the CPU 13 determines whether or not the information has been read from the tag 2 (step S74). When the information has not been read from the tag 2 (step S74: NO), the CPU 13 performs the process step of step S73 again. The process of steps S73 and S74 is repeatedly performed at predetermined time intervals, whereby the disk 73 rotates at a constant speed until the information stored in the tag 2 is read (until the tag 2 is placed at the placement portion). The rotation of the disk 73 causes change of the areas indicated by the arrow 74. Thus, the right to answer is shifted among the users in the order having been set in step S71.

In a case where the information has been read from the tag 2 (step S74: YES), the CPU 13 determines whether or not the user associated with the read information currently has the right to answer, based on the answer reception period having been set for each user in step S71, and a time that has elapsed after the question has been presented in step S72 (step S75).

When the user associated with the read information is determined to currently have the right to answer (step S75: YES), the CPU 13 performs an answer reception process (step S76). Specifically, the CPU 13 obtains the operation information associated with an operation performed on the input section 16, and determines whether or not the answer inputted by the user is correct, based on the operation information (step S77). When the answer is determined to be correct (step S77: YES), the CPU 13 performs addition of a point for the user that has given the correct answer to the question (step S78). When the addition of the point has been performed in step S78, or when the answer inputted by the user is determined to be incorrect (step S77: NO), the CPU 13 ends the question (step S79).

On the other hand, in a case where the CPU 13 determines that the user associated with the read information is determined to currently have no right to answer (step S75: NO), the CPU 13 shortens the answer reception period for the user associated with the read information, and the answer reception period for another user is increased by the shortened period of the answer reception period for the user associated with the read information (step S80). For example, the CPU 13 shortens, by three seconds, the answer reception period for the user associated with the read tag information, and increases, by one second, the answer reception period for each of the other remaining three users. Thus, in the disk 73, the area for the user associated with the information read from the tag 2 is reduced, and the area for each of the other users is increased. In a case where the CPU 13 performs the process step of step S80, the CPU 13 then performs the process step of step S73 again.

When the process step of step S79 has been performed, the CPU 13 determines whether or not all the questions have been ended (step S81). In a case where all the questions have not been ended (step S81: NO), the CPU 13 performs the process step of step S71 again, and presents the following question to the users. In a case where all the questions have been ended (step S81: YES), the CPU 13 has performed the process shown in FIG. 20.

Thus, in the second embodiment, the answer reception period is set for each user (S71), and an answer from the user is received only in the answer reception period having been set. That is, the information processing apparatus 3 sets a read period in which the information stored in the tag 2 for each user is to be read (S71), and determines whether or not the time at which the information stored in the tag 2 has been read, is in the read period having been set (S75). When the time is in the read period, the information processing apparatus 3 receives the answer from the user. When the time is not in the read period, the information processing apparatus 3 imposes a penalty on the user.

Thus, in a game which proceeds by a plurality of persons moving the tags 2 close to the information processing apparatus 3 such that the information is read, the game may smoothly proceed. For example, in a case where a plurality of persons are allowed to simultaneously answer, when the plurality of persons thus attempt to simultaneously answer the question, each user tends to compete to place her/his own tag 2 at the placement portion of the information processing apparatus 3 (attempts to move the tag 2 close to the information processing apparatus 3). In this case, the plurality of persons scramble for the placement portion, and the game cannot smoothly proceed. On the other hand, in the present embodiment, the answer reception period is set for each user, and each user cannot answer in a period other than the answer reception period. Therefore, each user has difficulty in competing to cause the information processing apparatus 3 to read the tag 2, whereby the game can smoothly proceed. Further, when the user places the tag 2 at the placement portion in a period other than the answer reception period, a penalty is imposed on the user. Therefore, a user can be prevented from placing the tag 2 at the placement portion in a period other than the answer reception period. Further, in the present embodiment, each user has her/his own tag 2, and the information processing apparatus 3 identifies the tag 2 associated with each user, to identify the user. Therefore, spoofing in which a user pretends to be another user can be prevented. For example, when a user's own answer button (push button or button displayed on a touch panel) is prepared and fastest finger first is played, a user can easily pretend to be another user by pressing the other user's answer button. However, in the present embodiment, each user has her/his own tag 2 and uses the tag 2 to answer, thereby preventing such a spoofing.

As described above, in the present embodiment, a predetermined read period is preset, and whether or not a point of time when the information has been obtained from the tag 2 by the near field communication is in the predetermined read period, is determined. When the point of time when the information has been obtained from the tag 2 is in the predetermined read period, a first process (process of receiving an answer from a user: step S76) is performed. When the point of time when the information has been obtained from the tag 2 is not in the predetermined read period, a second process (process of imposing a penalty: step S80) that causes the user to have a disadvantage is performed. In another example, a read time point is set for each user, and whether or not the read time point having been set is in a predetermined time period including a point of time when the information has been obtained from the tag 2, may be determined.

Figure 21:
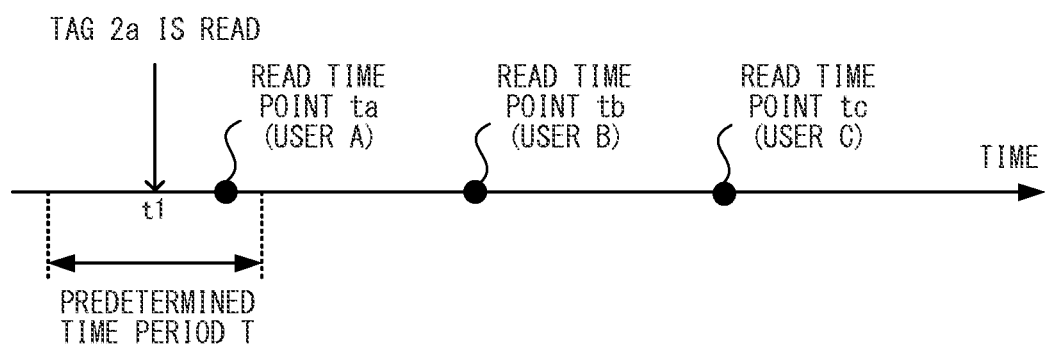
FIG. 21 is a diagram illustrating a non-limiting example of a state where a read time point is set for each user, and whether or not the read time point having been set is in a predetermined time period including a point of time when information has been obtained from the tag 2.

FIG. 21 is a diagram illustrating a state where the read time point is set for each user, and whether or not the read time point having been set is in a predetermined time period including a point of time when the information has been obtained from the tag 2 is determined. As shown in FIG. 21, a read time point (ta, tb, tc, or the like) is preset for each user. For example, when the information stored in the tag 2a has been read, whether or not the time point ta having been preset is in a predetermined time period T including a point of time t1 when the information stored in the tag 2a has been read, may be determined.

Thus, whether or not the timing when the information has been obtained from the tag 2 is predetermined read timing, may be determined. The "predetermined read timing" may be a point of time or a time period. Further, the "timing when the information has been obtained from the tag 2" may be a point of time or a time period. That is, the predetermined read timing (a point of time or time period) is preset, and whether or not the timing (a point of time when the information has been read or a time period defined by the point of time) when the information has been obtained from the tag 2 meets the predetermined read timing may be determined. When these two timings meet each other, the first process is performed as described above. When these two timings do not meet each other, the second process is performed.

Further, in the above embodiment, it is assumed that a plurality of persons play the game. However, one person may play the game. When one person plays the game, for example, an area (area representing the answer reception period) associated with one user and another area (area representing a period in which the user cannot answer) may be allocated in the disk 73 shown in FIG. 17. Only when the area associated with the one user is indicated by the arrow 74 representing a right to answer, the user is allowed to place the tag 2 at the placement portion and answer a question.

Further, in the above embodiment, a quiz game is assumed in which a user uses the tag 2 to answer a question in the answer reception period having been set. As an application to be executed, any other application as well as a quiz game may be executed. For example, a rhythm game or a timing game may be played by using the tag 2. Alternatively, for example, a messaging application or a chat application as well as a game may be executed. For example, in a rhythm game, timing (period) based on a rhythm of predetermined music is set, and the user operates such that the tag 2 is read at the timing having been set. When the information stored in the tag 2 is read at the timing having been set, a point is added. When the information is not read at the timing, no point is added.

Figure 22:
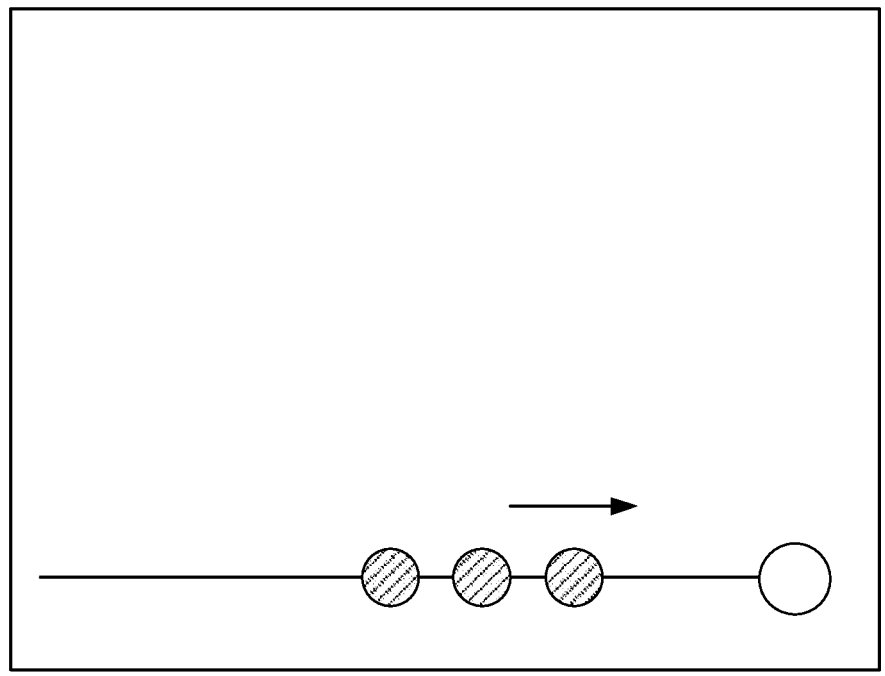
FIG. 22 is a diagram illustrating a non-limiting example of an application according to another embodiment.

FIG. 22 shows an example of an application according to another embodiment. As shown in FIG. 22, for example, a predetermined object moves from the left side toward the right side on the screen, and, at timing when the predetermined object reaches a predetermined area (outline circle on the right end of the screen), an operation is performed such that the information stored in the tag 2 is read. When the information stored in the tag 2 is read at appropriate timing, a point is added. That is, a predetermined read time is set, and whether or not the information stored in the tag 2 is read at the predetermined read time, is determined, and a process (addition or subtraction of a point, or the like) based on the determination result may be performed. The "read time" described herein may be a time period or a point of time.

Further, the configuration of the information processing system 1 is not limited to the above described one, and may be any configuration. For example, the information processing system may include a plurality of information processing apparatuses or a plurality of display units. For example, the information processing system may include: a stationary device connected to a stationary display such as a television; and a hand-held (movable) device having a display. In this case, any image may be outputted to the two displays. For example, the right-to-answer display image 72 may be displayed on the display of the hand-held device, and a question may be displayed on the stationary display. Further, the hand-held device may have the placement portion (a portion to which the tag 2 is moved close) for placing the tag 2. Alternatively, the stationary device may have the placement portion.

Further, the information processing system may be configured by a plurality of information processing apparatuses connected to a network. For example, the plurality of information processing apparatuses may be connected to each other via the Internet, and the plurality of information processing apparatuses may be used to execute the application. For example, each of the information processing apparatuses includes the placement portion at which the tag 2 is read, and the read time is set for each of the information processing apparatuses. When the tag 2 is read in the read time having been set, a user of the information processing apparatus is allowed to answer a question.

Further, in the above embodiment, the answer reception periods (read periods) set for the respective users do not overlap. That is, at a certain point of time, only one user is allowed to answer. In another embodiment, a plurality of users may be allowed to simultaneously answer a question. For example, when the information processing apparatus has a plurality of placement portions, or when the information processing system is configured by a plurality of information processing apparatuses having the placement portions, even if the answer reception periods for respective users overlap, the users do not scramble for the placement portion. Therefore, in such a configuration, the answer reception period for a user and the answer reception period for another user may overlap. On the other hand, a game may be assumed in which one placement portion is provided, the read periods set for the respective users overlap, and a plurality of users thus scramble for the placement portion.

Further, the processes shown in the flow charts in the first and the second embodiments are merely illustrative, and the order in which the process steps are performed and the contents of the process may be modified as appropriate.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

In the present embodiment, in order to, for example, use the storage device for a wider range of purposes, the storage device may be used as, for example, a game device or a game system for executing a game application or the like, or a storage device having game data stored therein.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program to be executed by a computer of an information processing apparatus configured to obtain information stored in an information storage medium through near field communication, the program, when executed by the computer, causes the computer to provide execution comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when the operation object is positioned at a predetermined position within a predetermined range in the virtual space, the predetermined condition is determined to be satisfied.

2. The non-transitory computer-readable storage medium according to claim 1, wherein, when the operation object is determined to satisfy the predetermined condition, setting is performed such that the information can be read from the information storage medium through the near field communication.

3. The non-transitory computer-readable storage medium according to claim 2, wherein, when the operation object is determined to satisfy the predetermined condition, radio wave is transmitted for reading the information from the information storage medium.

4. The non-transitory computer-readable storage medium according to claim 1, wherein whether or not the operation object satisfies the predetermined condition is repeatedly determined, and setting is performed such that the information stored in the information storage medium can be obtained while the operation object is determined to satisfy the predetermined condition.

5. The non-transitory computer-readable storage medium according to claim 1, wherein setting is performed such that the information stored in the information storage medium can be obtained when and after the operation object has been determined to satisfy the predetermined condition.

6. The non-transitory computer-readable storage medium according to claim 1, wherein a predetermined process is performed by obtaining the information stored in the information storage medium, when setting is performed such that the information stored in the information storage medium can be obtained.

7. The non-transitory computer-readable storage medium according to claim 6, wherein the predetermined process is performed so as to be associated with the operation object.

8. The non-transitory computer-readable storage medium according to claim 6, wherein the predetermined process is performed so as to be associated with the information obtained from the information storage medium.

9. The non-transitory computer-readable storage medium according to claim 6, wherein replacement of the operation object with an object associated with the information obtained from the information storage medium is performed as the predetermined process.

10. The non-transitory computer-readable storage medium according to claim 1, wherein the information processing apparatus can perform the near field communication when the information processing apparatus and the information storage medium are close to each other.

11. A non-transitory computer-readable storage medium having stored therein an information processing program to be executed by a computer of an information processing apparatus configured to obtain information stored in an information storage medium through near field communication, the program, when executed by the computer, causes the computer to provide execution comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when a distance between the operation object and a predetermined object in the virtual space is less than or equal to a predetermined value, the predetermined condition is determined to be satisfied.

12. An information processing apparatus configured to obtain information stored in an information storage medium through near field communication, the information processing apparatus having at least one processor configured to provide execution comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when the operation object is positioned at a predetermined position within a predetermined range in the virtual space, the predetermined condition is determined to be satisfied.

13. An information processing system configured to obtain information stored in an information storage medium through near field communication, the information processing system comprising:

a processing system having at least one processor, the processing system configured to:

position, in a virtual space, an operation object to be operated;

control the operation object in the virtual space according to an operation of a user performed on the input section;

determine whether or not the operation object controlled according to the operation of the user performed on the input section satisfies a predetermined condition; and perform setting such that information stored in the information storage medium can be obtained when the operation object is determined to satisfy the predetermined condition, wherein when the operation object is positioned at a predetermined position within a predetermined range in the virtual space, the predetermined condition is determined to be satisfied.

14. An information processing method to be executed by an information processing system configured to obtain information stored in an information storage medium through near field communication, the method comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when the operation object is positioned at a predetermined position within a predetermined range in the virtual space, the predetermined condition is determined to be satisfied.

15. An information processing apparatus configured to obtain information stored in an information storage medium through near field communication, the information processing apparatus having at least one processor configured to provide execution comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when a distance between the operation object and a predetermined object in the virtual space is less than or equal to a predetermined value, the predetermined condition is determined to be satisfied.

16. An information processing system configured to obtain information stored in an information storage medium through near field communication, the information processing system comprising:

a processing system having at least one processor, the processing system configured to:

position, in a virtual space, an operation object to be operated;

control the operation object in the virtual space according to an operation of a user performed on the input section;

determine whether or not the operation object controlled according to the operation of the user performed on the input section satisfies a predetermined condition; and perform setting such that information stored in the information storage medium can be obtained when the operation object is determined to satisfy the predetermined condition, wherein when a distance between the operation object and a predetermined object in the virtual space is less than or equal to a predetermined value, the predetermined condition is determined to be satisfied.

17. An information processing method to be executed by an information processing system configured to obtain information stored in an information storage medium through near field communication, the method comprising:

positioning, in a virtual space, an operation object to be operated;

controlling the operation object in the virtual space according to an operation of a user performed on an input section;

determining whether or not the operation object controlled according to the operation of the user performed on the input section satisfies a predetermined condition; and performing setting such that information stored in the information storage medium can be obtained when the operation object is determined to satisfy the predetermined condition, wherein when a distance between the operation object and a predetermined object in the virtual space is less than or equal to a predetermined value, the predetermined condition is determined to be satisfied.

* * * * *